US010102162B2

(12) United States Patent
Lee

(10) Patent No.: US 10,102,162 B2
(45) Date of Patent: Oct. 16, 2018

(54) METHOD AND APPARATUS FOR PROCESSING ADAPTIVE INTERRUPT, HOST EMPLOYING THE SAME, I/O DEVICE AND SYSTEM

(71) Applicant: Ju-pyung Lee, Incheon (KR)

(72) Inventor: Ju-pyung Lee, Incheon (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 238 days.

(21) Appl. No.: 15/014,639

(22) Filed: Feb. 3, 2016

(65) Prior Publication Data

US 2016/0350242 A1    Dec. 1, 2016

(30) Foreign Application Priority Data

May 27, 2015  (KR) ......................... 10-2015-0073927

(51) Int. Cl.
| G06F 13/24 | (2006.01) |
| G06F 9/48 | (2006.01) |
| G06F 1/20 | (2006.01) |
| G06F 13/26 | (2006.01) |
| G06F 1/32 | (2006.01) |

(52) U.S. Cl.
CPC .............. *G06F 13/24* (2013.01); *G06F 1/206* (2013.01); *G06F 1/3206* (2013.01); *G06F 9/4812* (2013.01); *G06F 13/26* (2013.01)

(58) Field of Classification Search
CPC ......... G06F 9/4812; G06F 13/24; G06F 13/26
See application file for complete search history.

(56) References Cited

U.S. PATENT DOCUMENTS

| 6,189,066 | B1 | 2/2001 | Lowe et al. |
| 7,478,186 | B1* | 1/2009 | Onufryk ................. G06F 13/24 |
| | | | 710/263 |
| 7,788,434 | B2 | 8/2010 | Pesavento et al. |
| 7,788,435 | B2 | 8/2010 | Worthington et al. |
| 7,987,307 | B2* | 7/2011 | Sarangam ............... G06F 13/26 |
| | | | 710/260 |
| 8,259,576 | B2 | 9/2012 | Lee et al. |
| 8,478,924 | B2 | 7/2013 | Ahmad et al. |
| 8,510,491 | B1 | 8/2013 | Hendel et al. |
| 8,677,042 | B2 | 3/2014 | Gupta et al. |
| 2010/0274938 | A1* | 10/2010 | Anand .................... G06F 13/24 |
| | | | 710/263 |

(Continued)

Primary Examiner — Glenn A. Auve
(74) Attorney, Agent, or Firm — Harness, Dickey & Pierce, P.L.C.

(57) ABSTRACT

Processing an adaptive interrupt includes selectively setting an input/output (I/O) device in a computing system to an adaptive masking mode when at least one factor value of the at least one I/O device regarding a workload of the computing system exceeds a first threshold condition. Processing the adaptive interrupt further includes performing an interrupt masking process, where an interrupts generated by an I/O device set to the adaptive masking mode are prevented from being output when a time interval between I/O submission events of the I/O device is less than a first threshold value. The adaptive interrupt may be processed by an adaptive interrupt processing module (AIPM). The AIPM may be included in various portions of the computing system, including the I/O device and a host connected to the I/O device.

19 Claims, 26 Drawing Sheets

(56) References Cited

U.S. PATENT DOCUMENTS

| | | | |
|---|---|---|---|
| 2014/0040514 A1* | 2/2014 | Li | G06F 13/24 |
| | | | 710/48 |
| 2014/0195708 A1 | 7/2014 | Klein et al. | |
| 2014/0310439 A1* | 10/2014 | Bshara | G06F 13/24 |
| | | | 710/262 |
| 2015/0212564 A1* | 7/2015 | Min | G06F 13/24 |
| | | | 713/320 |
| 2015/0286594 A1* | 10/2015 | Degani | G06F 13/24 |
| | | | 710/261 |
| 2016/0124874 A1* | 5/2016 | Hassan | G06F 13/24 |
| | | | 710/263 |

* cited by examiner

METHOD AND APPARATUS FOR PROCESSING ADAPTIVE INTERRUPT, HOST EMPLOYING THE SAME, I/O DEVICE AND SYSTEM

CROSS-REFERENCE TO RELATED APPLICATION

This application claims the benefit of Korean Patent Application No. 10-2015-0073927, filed on May 27, 2015, in the Korean Intellectual Property Office, the disclosure of which is incorporated herein in its entirety by reference.

BACKGROUND

The inventive concepts relates to a method of and apparatus for processing an interrupt, and more particularly, to a method of and apparatus for processing an adaptive interrupt to improve system performance.

In general, when a large number of interrupts are generated in a computing system, where the system includes a host and an I/O device, a considerable amount of central processing unit (CPU) cycles are consumed by the host to process the interrupts. Thus, performance of the computing system may be degraded, or an interrupt storm consuming a lot of energy may occur.

SUMMARY

The inventive concepts provide a method of processing an interrupt which consumes a small number of central processing unit (CPU) cycles in a host according to interrupt processing and decreases input/output (I/O) latency.

The inventive concepts provide an apparatus for processing an interrupt which consumes a small number of CPU cycles according to interrupt processing and decreases I/O latency.

The inventive concepts provide a host for processing an interrupt which consumes a small number of CPU cycles according to interrupt processing and decreases I/O latency.

The inventive concepts provide an I/O device for processing an interrupt which consumes a small number of CPU cycles according to interrupt processing and decreases I/O latency.

The inventive concepts provide a system for processing an interrupt which consumes a small number of CPU cycles according to interrupt processing and decreases I/O latency.

According to an aspect of the inventive concepts, there is provided a method of processing an adaptive interrupt, the method including: setting at least one I/O device to an adaptive masking mode when at least one factor value of the at least one I/O device exceeds a first threshold condition, the at least one factor value being associated with a workload of a computing system, the computing system including the at least one I/O device; performing an interrupt masking process for the at least one I/O device set to the adaptive masking mode when a time interval between I/O submission events is less than a first threshold value; and processing a response to a non-processed interrupt according to the interrupt masking process in a thread where at least one I/O submission event occurs.

According to another aspect of the inventive concepts, there is provided an apparatus for processing an adaptive interrupt, the apparatus including: a processor; and a memory, the memory storing instructions that, when executed by the processor, configure the processor to selectively set at least one I/O device to an adaptive masking mode based on at least one factor value regarding a workload of a computing system, the system including the at least one I/O device; determine whether a time interval between I/O submission events in the at least one I/O device set to the adaptive masking mode is equal to or less than a threshold interval; set the at least one I/O device to an interrupt masking enable state, maintain the at least one I/O device in the interrupt masking enable state, or switch the at least one I/O device to an interrupt masking disable state from the interrupt masking enable state based on whether an I/O submission event occurs within the threshold interval; and prevent an interrupt signal generated by the at least one I/O device from being output to a CPU of the host, such that the interrupt signal is a non-processed interrupt, based on a determination that the at least one I/O device is set to the interrupt masking enable state.

According to another aspect of the inventive concepts, there is provided a host including: a first processor configured to perform an interrupt routine based on an I/O submission thread and an interrupt signal received from an I/O device; and a second processor configured to determine whether to set the I/O device to an adaptive masking mode based on a workload of a computing system, the computing system including the host and the I/O device; the second processor being further configured to prevent the interrupt signal, from being transmitted to the CPU when the I/O device is set to the adaptive masking mode and a time interval between I/O submission events of the I/O device is less than a first threshold value, wherein a response to a non-processed interrupt is processed in an I/O submission thread, wherein the non-processed interrupt is an interrupt that is not processed in a time period where an interrupt masking mode is performed.

According to another aspect of the inventive concepts, there is provided an I/O device including: a memory device; a memory controller configured to write data to the memory device according to an I/O submission event received from a host, read the data from the memory device, and generate an interrupt signal after performing an operation regarding the I/O submission event; and a processor configured to set the I/O device to an adaptive masking mode when a number of interrupts generated by the memory controller per unit of elapsed time exceeds a first threshold value; the processor being further configured to prevent the interrupt signal from being output to the host when a time interval between I/O submission events of the I/O device set to the adaptive masking mode is less than a second threshold value.

According to another aspect of the inventive concepts, there is provided a computing system including: a host; and one or more I/O devices, wherein the host is configured to transmit an input/output (I/O) submission event to the one or more I/O devices and process an interrupt based on an interrupt signal received from the one or more I/O devices, wherein the one or more I/O devices are configured to perform an operation regarding the I/O submission event received from the host and generate an interrupt signal based on completing the operation, wherein the system further comprises a processor configured to selectively set the one or more I/O devices to an adaptive masking mode based on at least one factor value regarding a workload of the computing system, the processor being configured to prevent interrupt signals generated by the one or more I/O devices set to the adaptive masking mode from being output to the host when a time interval between I/O submission events of the one or more I/O devices is less than a first threshold value, and wherein a response to a non-processed interrupt that is not processed in a time period where the interrupt masking mode is performed is processed in an I/O submission context of the host.

According to another aspect of the inventive concepts, there is provided a method including: selectively setting an I/O device to an adaptive masking mode when at least one factor value of the I/O device at least meets a first threshold condition, the at least one factor value being associated with a workload of a computing system, the computing system including the I/O device; and selectively preventing an interrupt signal generated by the I/O device from being output to the host when the I/O device is set to the adaptive making mode and a time interval between I/O submission events of the I/O device set to the adaptive masking mode is less than a first threshold value.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Example embodiments of the inventive concepts will be more clearly understood from the following detailed description taken in conjunction with the accompanying drawings in which.

DETAILED DESCRIPTION OF THE EMBODIMENTS

Figure 1:
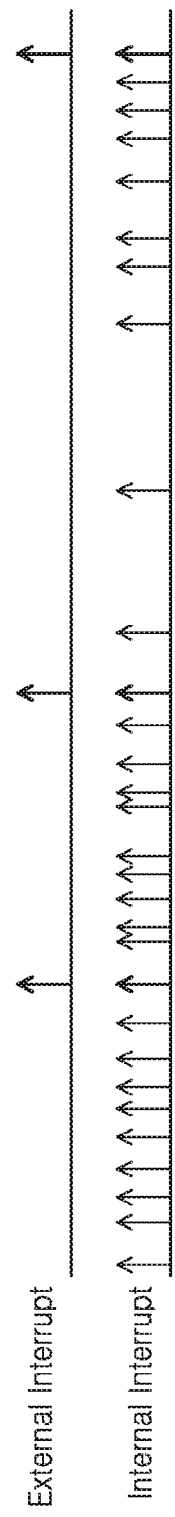
FIG. 1 illustrates a generation state of an interrupt signal according to an interrupt coalescing method of a first type, according to some example embodiments.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Types of interrupt coalescing methods will be described to improve an interrupt storm that degrades performance of a computing system including a host and one or more input/output (I/O) devices because of a considerable amount of interrupts generated from the I/O devices.

FIG. 1 illustrates a generation state of an interrupt signal according to an interrupt coalescing method of a first type, according to some example embodiments.

The interrupt coalescing method of the first type is used to generate an interrupt once per a set number of collected interrupts. In detail, the interrupt coalescing method of the first type is a method of transmitting an interrupt signal to a host when a count value indicating the number of interrupts generated in an I/O device is equal to a set value.

FIG. 1 illustrates a case where an external interrupt signal is generated once per every ten internal interrupts within the I/O device and then the generated external interrupt signal is transmitted to the host. That is, an external interrupt signal may be generated and transmitted to the host whenever the number of interrupts generated in the I/O device is equal to 10, 20, and 30. Accordingly, reduction rate of the number of interrupts may be 10:1.

According to the interrupt coalescing method of the first type, when the frequency in which internal interrupts are generated is low, latency between some internal interrupts and external interrupts increases, and thus, processing some interrupts may be significantly delayed.

Figure 2:
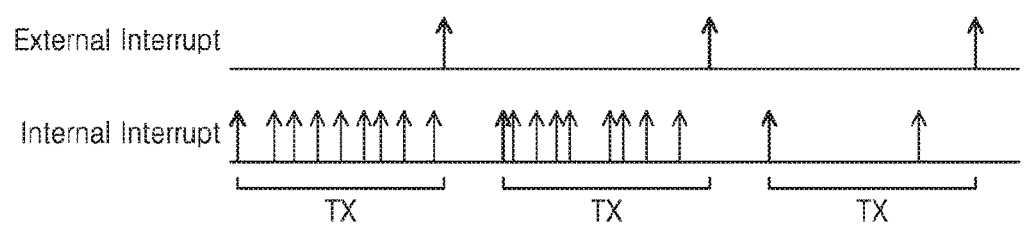
FIG. 2 illustrates a generation state of an interrupt signal according to an interrupt coalescing method of a second type, according to some example embodiments.

FIG. 2 illustrates a generation state of an interrupt signal according to an interrupt coalescing method of a second type, according to some example embodiments.

The interrupt coalescing method of the second type is used to generate an interrupt once after a set amount of time following a collected interrupt, for example, by collecting interrupts over a desired (or, alternatively predetermined) time period (TX). That is, the interrupt coalescing method of the second type is a method of transmitting an interrupt to the outside when a set amount of time elapses following a time point when a first internal interrupt is generated.

FIG. 2 illustrates that an external interrupt signal is generated and then transmitted to the host after a unit of elapsed time (TX) from the point in time when the first internal interrupt is generated.

According to the interrupt coalescing method of the second type, interrupt reduction efficiency decreases when a frequency in which an internal interrupt is generated is low. Also, latency between an internal interrupt and an external interrupt increases to a desired (or, alternatively predetermined) time unit, and thus, processing some interrupts may be delayed.

Figure 3:
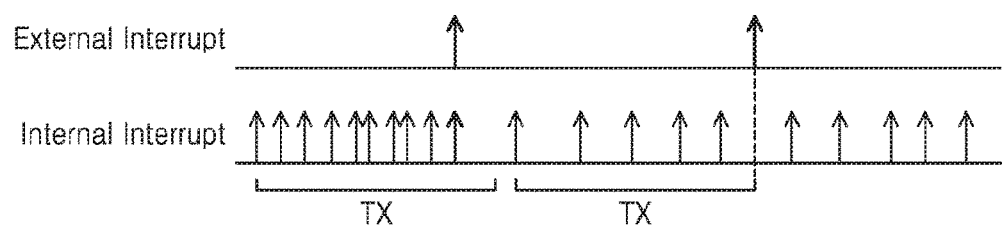
FIG. 3 illustrates a generation state of an interrupt signal according to an interrupt coalescing method of a third type, according to some example embodiments.

FIG. 3 illustrates a generation state of an interrupt signal according to an interrupt coalescing method of a third type, according to some example embodiments.

The interrupt coalescing method of the third type is a hybrid method using both the interrupt coalescing method of the first type and the interrupt coalescing method of the second type.

FIG. 3 illustrates a case where interrupt coalescing is performed according to the number ("quantity") of internal interrupts, but when the unit of elapsed time TX elapses following the point in time when the first internal interrupt is generated, an external interrupt is generated regardless of the number of generated internal interrupts.

The interrupt coalescing methods of the first type, second type, and third types are effective to reduce the number of generated external interrupts, but latency of some internal interrupts may increase.

Figure 4:
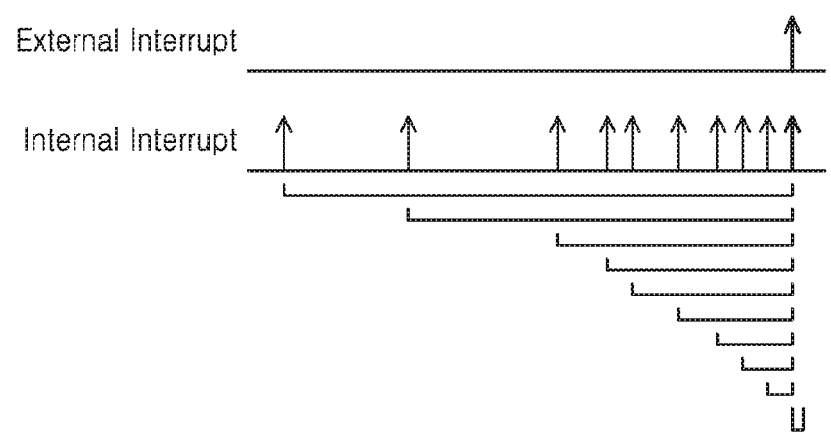
FIG. 4 illustrates an example of an interrupt latency generated according to the interrupt coalescing methods of the first to third types, according to some example embodiments.

FIG. 4 illustrates an example of an interrupt latency generated according to the interrupt coalescing methods of the first type, second type, and third types, according to some example embodiments. Referring to FIG. 4, the latency between the internal interrupt events and the external interrupts may be greater than one or more latencies between interrupt events and external interrupts in some example embodiments where interrupt coalescing is performed.

Some example embodiments include a method of processing an adaptive interrupt so as to correct the above-described weak points of the interrupt coalescing methods of the first to third types.

A basic concept of the method included in some example embodiments is as follows.

In some example embodiments, processing circuitry cycles, which may include central processing unit (CPU) cycles, may be determined based on the number of interrupts. When the number of generated internal interrupts is small, the host may consume a small number of central processing unit (CPU) cycles, and thus, an influence of interrupts on a system may be small. As a result, an increase in interrupt latency may be prevented or minimized.

In some example embodiments, the number of interrupts generated in the I/O device is large because an I/O command submission frequently occurs in the host. The I/O device may be a passive device and may generate a lot of interrupt events when a large number of commands are input from the host. Therefore, interrupt masking may be controlled based on a time interval of an I/O command submission occurrence.

In some example embodiments, the interrupt does not have to be processed in an interrupt handler context by the host. Accordingly, the interrupt may be processed in a thread context where the I/O command submission is performed. For example, according to a Non-Volatile Memory express (EVMe) standard, which is a Peripheral Component Interconnect express (PCIe) solid state drive (SSD) standard, the I/O submission may be performed by inserting a command into a submission queue (SQ). Interrupt processing, that is, response processing, may be performed by dequeuing a relevant response from a completion queue (CQ). Therefore, according to the method of processing the adaptive interrupt of the inventive concept, a command may be inserted into the submission queue SQ in the thread where the I/O submission is performed, and then a non-processed response existing in the completion queue CQ may be processed in the same context as the above context without switching contexts.

A method of processing the adaptive interrupt according to some example embodiments will be described below.

Figure 5:
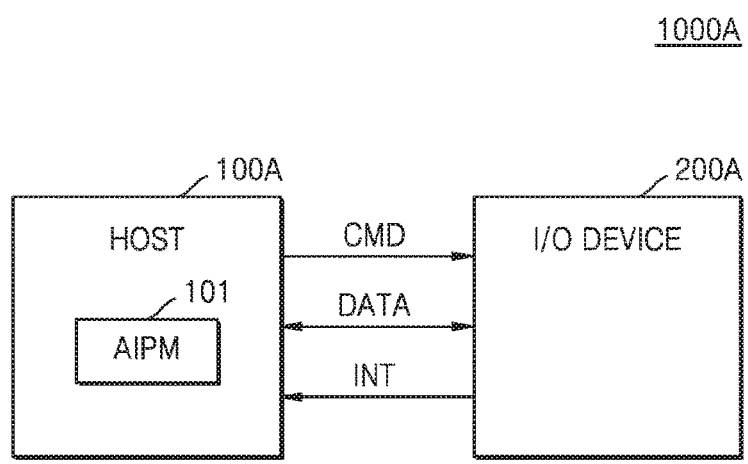
FIG. 5 illustrates an example of a structure of a computing system according to some example embodiments.

FIG. 5 illustrates an example of a structure of a computing system 1000A according to some example embodiments.

As illustrated in FIG. 5, the computing system 1000A may include a host 100A and an I/O device 200A.

The computing system 1000A may be a personal computer (PC), a set-top-box, a digital camera, a navigation device, a mobile device, a smart card system, or the like. The I/O device 200A may be a memory device, an SSD, a smart card, or the like.

The host 100A and the I/O device 200A are electrically connected to each other. Various interface specifications may be applied to an interface used between the host 100A and the I/O device 200A. For example, a Universal Flash Storage (UFS) interface, an embedded Multi-Media Card (eMMC) interface, a Serial Advanced Technology Attachment (SATA) interface, a Serial Advanced Technology Attachment express (SATAe) interface, a Small Computer System Interface (SCSI), a Small Computer System Interface express (SCSIe) interface, an NVMe interface, a PCI interface, a PCIe interface, etc. may be used.

The host 100A transmits, to the I/O device 200A, a command CMD issued based on a task to be performed. For example, the command CMD issued by the host 100A may include a write command or a read command. The host 100A transmits data DATA to be stored in the I/O device 200A or receives data DATA read from the I/O device 200A. The I/O device 200A transmits an interrupt signal INT to the host 100A after the execution of the command received from the host 100A is completed.

The host 100A includes an adaptive interrupt processing module (AIPM) 101. The AIPM 101 may include software or hardware used to perform flowcharts of FIGS. 23, 24, 25, and 26.

As described herein, an AIPM may include one or more hardware devices configured to implement one or more of selectively setting an I/O device to an adaptive masking mode, performing an interrupt masking process, processing at least one non-processed response to at least one interrupt, and some combinations thereof. The AIPM may include one or more computer processing devices, where each of the one or more computer processing devices is configured to implement one or more of selectively setting an I/O device to an adaptive masking mode, performing an interrupt masking process, processing at least one non-processed response to at least one interrupt, and some combinations thereof. In some example embodiments, the AIPM includes one or more storage devices, including one or more memories, storing program code that is executable by a computer processing device to cause the computer processing device to implement one or more of selectively setting an I/O device to an adaptive masking mode, performing an interrupt masking process, processing at least one non-processed response to at least one interrupt, and some combinations thereof.

In some example embodiments, the AIPM 101 supports setting the I/O device 200A to be in an adaptive masking mode when at least one factor value regarding the workload of the computing system 1000A exceeds a first threshold condition that is initially set.

As described herein, it will be understood that a device "set to" a mode may be interchangeably referred to as being "in" the mode, "set to be in" the mode, and the like. For example, setting the I/O device 200A to be in an adaptive masking mode may be referred to interchangeably as setting the I/O device 200A to the adaptive masking mode. In addition, upon being set to the adaptive masking mode, the I/O device 200A may be referred to as being "in" the adaptive masking mode.

In some example embodiments, the AIPM 101 supports performing an interrupt masking process when a time interval of an I/O submission event occurrence of the I/O device 200A that is set to the adaptive masking mode is less than a first threshold value. In some example embodiments, the AIPM 101 supports processing a response to a non-processed interrupt in a thread where the I/O submission event occurs, where the non-processed interrupt has not been processed in a time period where the interrupt masking process is performed.

The AIPM 101 may perform an operation of setting the I/O device 200A to the adaptive masking mode when the number of generated interrupt signals INT per unit of elapsed time which is received from the I/O device 200A exceeds a second threshold value.

The AIPM 101 may perform an operation of setting the I/O device 200A to the adaptive masking mode when at least one of a workload, consumed power, and a detected temperature of the host 100A exceeds a first threshold value.

The AIPM 101 may perform an operation of setting the I/O device 200A, which has been set to the adaptive masking mode, to an interrupt masking enable state or to remain in the interrupt masking enable state when an I/O submission event occurs. The AIPM 101 may perform an operation of setting the I/O device 200A to an interrupt masking disable state when an $(N+1)^{th}$ I/O submission event does not occur in a time period from a point of time when an $N^{th}$ I/O submission event occurs (where, N is an integer equal to or greater than 1) to a threshold time point. Where the I/O device is set to the interrupt masking disable state, the interrupt masking process may be skipped.

The AIPM 101 may perform an operation of switching the I/O device 200A from the interrupt masking disable state to the interrupt masking enable state again when the I/O submission event with regard to the I/O device 200A occurs in the host 100B after the I/O device 200A in the adaptive masking mode is switched from a current state to the interrupt masking disable state.

The AIPM 101 may ignore the interrupt signal INT received from the I/O device 200A when the I/O device 200A is set to the interrupt masking enable state. That is, switching to an interrupt context in the host 100A may be blocked in response to the interrupt signal INT received from the I/O device 200A that is set to the interrupt masking enable state.

The AIPM 101 of the host 100A may perform an operation of processing, in a non-masking mode, an interrupt in response to the interrupt signal INT generated by the I/O device 200A that remains in the interrupt masking disable state. That is, after being switched to the interrupt context, the host 100A may perform an interrupt process routine in response to the interrupt signal INT received from the I/O device 200A that is set to the interrupt masking disable state.

The AIPM 101 may perform an operation of switching the I/O device 200A to a non-masking mode from the adaptive masking mode when one or more factor values with regard to the workload of the host 100A are within a range set by a second threshold condition after the I/O device 200A is set to the adaptive masking mode. In detail, when the number of interrupts generated per unit of elapsed time by the I/O device 200A that is set to the adaptive masking mode is less than a third threshold value, the mode of the I/O device 200A is switched from the adaptive masking mode to the non-masking mode. Here, the non-masking mode is a mode in which a masking process is not performed for the interrupt signal.

In the thread context where the I/O submission event occurs, the host 100A may support a function for performing a task of inserting a command regarding the I/O submission event into a submission queue and a task of processing a non-processed response to an internal interrupt of the I/O device 200A according to the interrupt masking process. For example, in the thread context where the I/O submission event occurs, the host 100A may perform the task of inserting the command regarding the I/O submission event into the submission queue and then the task of processing the non-processed response to the internal interrupt of the I/O device 200A which is stored in a completion queue in the same context as above.

A second threshold value used to determine whether to switch the non-masking mode to the adaptive masking mode may be set to be equal to a third threshold value used to determine whether to switch the adaptive masking mode to the non-masking mode.

The third threshold value may be smaller than the second threshold value. Setting the third threshold value to be smaller than the second threshold value may prevent frequent switching between the adaptive masking mode and the non-masking mode when the number of interrupts generated by the I/O device 200A per unit of elapsed time is slightly greater or less than the second threshold value.

Figure 6:
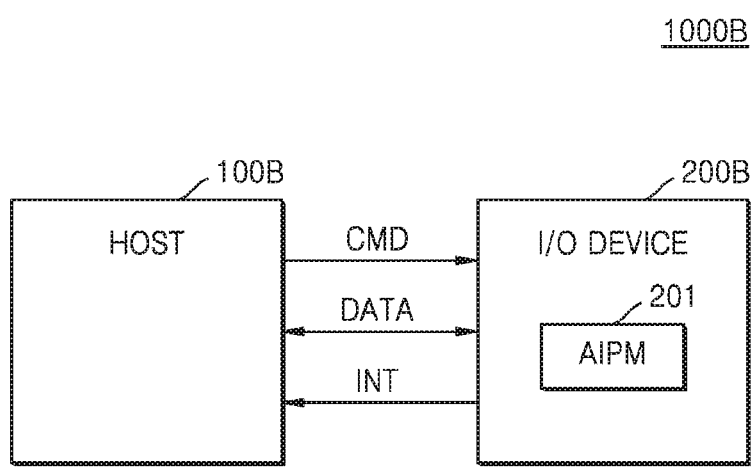
FIG. 6 illustrates another example of a structure of a computing system according to some example embodiments.

FIG. 6 illustrates another example of a structure of a computing system 1000B according to some example embodiments.

As illustrated in FIG. 6, the computing system 1000B may include a host 100B and an I/O device 200B.

In the computing system 1000A of FIG. 5, the AIPM 101 is included in the host 100A, but in the computing system 1000B of FIG. 6, an AIPM 201 is included in the I/O device 200B.

The computing system 1000B may be a PC, a set-top-box, a digital camera, a navigation device, a mobile device, a smart card system, or the like. The I/O device 200B may be a memory device, an SSD, a smart card, or the like.

The host 100B and the I/O device 200B are electrically connected to each other. Various interface specifications may be applied to an interface used between the host 100B and the I/O device 200B. For example, a UFS interface, an eMMC interface, a SATA interface, a SATAe interface, a SCSI interface, a SCSIe interface, an NVMe interface, a PCI interface, a PCIe interface, etc. may be used.

The host 100B transmits, to the I/O device 200B, a command CMD issued based on a task to be performed. The command CMD issued by the host 100B may include a write command and a read command. The host 100B transmits data DATA to be stored in the I/O device 200B or receives data DATA read from the I/O device 200B. The I/O device 200B transmits an interrupt signal INT to the host 100B after the execution of the command CMD received from the host 100B is completed.

The I/O device 200B includes the AIPM 201. The AIPM 201 is merely an example and may include software or hardware used to perform operations according to the flowcharts of FIGS. 23 to 26.

In some example embodiments, the AIPM 201 supports setting the I/O device 200B to the adaptive masking mode when at least one factor value regarding a workload of the computing system 1000B exceeds a first threshold condition that is initially set. In some example embodiments, the AIPM 201 supports performing an interrupt masking process when a time interval of an I/O submission event occurrence of the I/O device 200A that is set to the adaptive masking mode is less than a first threshold value. In some example embodiments, the AIPM 201 supports processing a response to a non-processed interrupt in a thread where the I/O submission event occurs, where the non-processed interrupt has not been processed in a time period where the interrupt masking process is performed. As another example, the AIPM 201 may support an operation of setting the I/O device 200B to the adaptive masking mode when at least one factor value regarding the workload of the computing system 1000B exceeds the first threshold condition that is initially set and an operation of performing the interrupt masking process when the time interval of the I/O submission event occurrence of the I/O device 200A that is set to the adaptive masking mode is less than the first threshold value. An operation of processing the response to the non-processed interrupt, which has not been processed in the time period where the interrupt masking process, in the thread where the I/O submission event occurs may be supported by the host 100B.

The AIPM 201 may perform an operation of setting the I/O device 200B to the adaptive masking mode when the number of generated interrupt signals INT_IN according to events processed by the I/O device 200B per unit of elapsed time exceeds the second threshold value.

The AIPM 201 may perform an operation of setting the I/O device 200B to the adaptive masking mode when at least one of the workload, the consumed power, and the detected temperature of the host 100B exceeds the first threshold condition.

The AIPM 201 may perform an operation of changing the state of the I/O device 200B to the interrupt masking enable state of maintaining the interrupt masking enable state when the I/O submission event is received by the I/O device 200B that enters the adaptive masking mode.

The AIPM 201 may perform an operation of setting the I/O device 200B, which is in the adaptive masking mode, to an interrupt masking enable state or to remain in the interrupt masking enable state when an I/O submission event is received by the I/O device 200B. In addition, the AIPM 201 may perform an operation of setting the I/O device 200B to an interrupt masking disable state when an $(N+1)^{th}$ I/O submission event is not received in a time period from a point of time when an $N^{th}$ I/O submission event (where, N is an integer equal to or greater than 1) is received to a threshold time point. Where the I/O device is set to the interrupt masking disable state, the interrupt masking process may be skipped.

The AIPM 201 may perform an operation of setting the I/O device 200B to the interrupt masking enable state again when the I/O submission event is received from the host 100B after a state of the I/O device 200B is set to the interrupt masking disable state.

When the I/O device 200B is set to the interrupt masking enable state, the AIPM 201 may prevent an internal interrupt signal INT_IN generated by the I/O device 200B from being output to the host 100B. When the I/O device 200B is set to the interrupt masking disable state, the AIPM 201 may allow the internal interrupt signal INT_IN generated by the I/O device 200B to be output to the host 100B. That is, an external interrupt signal INT_EX output from the I/O device 200B to the host 100B may be the internal interrupt signal INT_IN generated by the I/O device 200B that is set to the interrupt masking disable state.

The AIPM 201 performs an operation of switching a mode of the I/O device 200B to a non-masking mode from the adaptive masking mode when one or more factor values with regard to the workload of the host 100B are within the second threshold condition after the I/O device 200B is set to the adaptive masking mode. In detail, when the number of internal interrupts INT_IN generated per unit of elapsed time by the I/O device 200B that is set to the adaptive masking mode is less than the third threshold value, the mode of the I/O device 200B is switched from the adaptive masking mode to the non-masking mode.

The host 100B may perform an operation of processing an interrupt based on the interrupt signal INT received from the I/O device 200B. As described above, the interrupt signal INT received from the I/O device 200B is the external interrupt signal INT_EX output from the I/O device 200B that is set to the interrupt masking disable state. For example, when the interrupt signal INT received, the host 100B stops a context that is currently executed and switches the context to the interrupt context to thereby perform an interrupt processing routine.

In the thread context where the I/O submission event occurs, the host 100B supports a function for performing a task of inserting a command regarding the I/O submission event into a submission queue and a task of processing a non-processed response to an internal interrupt of the I/O device 200B according to the interrupt masking process. For example, in the thread context where the I/O submission event occurs, the host 100B performs the task of inserting the command regarding the I/O submission event into the submission queue and then the task of processing the non-processed response to the internal interrupt of the I/O device 200B which is stored in a completion queue in the same context as above.

Figure 7:
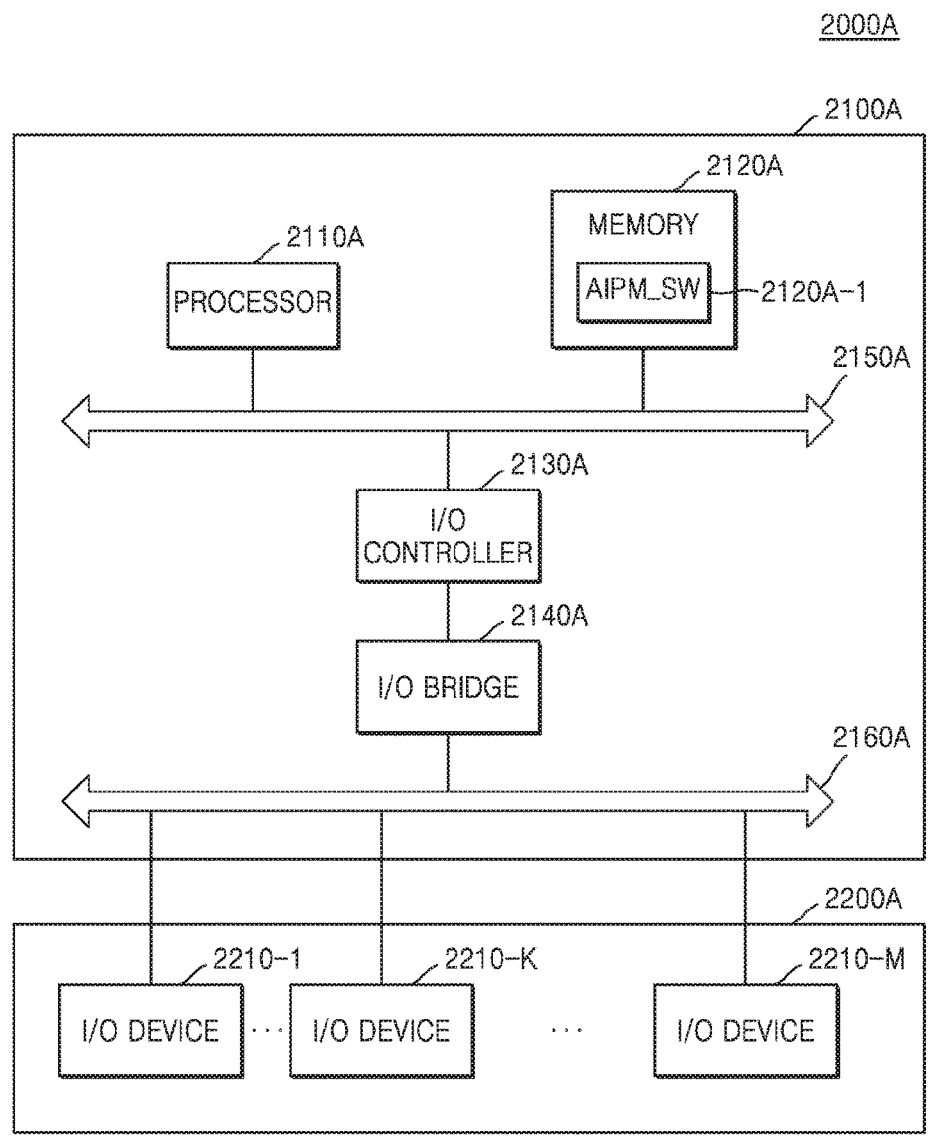
FIG. 7 illustrates another example of a structure of a computing system according to some example embodiments.

FIG. 7 illustrates another example of a structure of a computing system 2000A according to some example embodiments.

As illustrated in FIG. 7, the computing system 2000A may include a host 2100A and an I/O device 2200A.

The host 2100A includes a processor 2110A, a memory 2120A, an I/O controller 2130A, an I/O bridge 2140A, a host bus 2150A, and an I/O bus 2160A. The I/O device block 2200A includes I/O devices 2210-1 to 2210-M.

The computing system 2000A may be a PC, a set-top-box, a digital camera, a navigation device, a mobile device, a smart card system, a server system, or the like. The I/O devices 2210-1 to 2210-M included in the I/O device block 2200A may include a memory device, an SSD, a smart card, or the like.

The processor 2110A may include a circuit, interfaces, or program codes, all of which are used to control operations of components forming the computing system 2000A. For example, processor 2110A may include a CPU, an ARM, or an application specific integrated circuit (ASIC).

The memory 2120A may include static random access memory (SRAM) or dynamic RAM (DRAM) storing data, instructions, or program codes which are used to operate the computing system 2000A. Also, the memory 2120A may include a non-volatile memory. The memory 2120A stores a software program (i.e., AIPM_SW 2120A-1) for performing the method of processing the adaptive interrupt according to the flowcharts of FIGS. 23 to 26.

The processor 2110A may control the operations of the components forming the computing system 2000A by executing the programs stored in the memory 2120A. The processor 2110A may process the adaptive interrupt according to the flowcharts of FIGS. 23 to 26 by executing the software program (i.e., AIPM_SW 2120A-1) stored in the memory 2120A.

The I/O controller 2130A controls the I/O devices 2210-1 to 2210-M of the I/O device block 2200A. The I/O controller 2130A receives an I/O command from the processor 2110A and controls the I/O devices 2210-1 to 2210-M based on the received I/O command. Also, the I/O controller 2130A transmits, to the processor 2110A, interrupt signals received from the I/O devices 2210-1 to 2210-M.

In the host bus 2150A, components forming the host 2100A are electrically connected to each other. The components forming the host 2100A may exchange data and signals with each other via the host bus 2150A.

The I/O bridge 2140A may control channels for data communication between the host 2100A and the I/O devices 2210-1 to 2210-M. The I/O devices 2210-1 to 2210-M are electrically connected to each other via the I/O bus 2160A. The I/O bridge 2140A and the I/O bus 2160A may be respectively embodied as a PCIe bridge and a PCIe bus.

Data and signals may be exchanged between the host 2100A and the I/O devices 2210-1 to 2210-M via the I/O bus 2160A. For example, the host 2100A may receive an interrupt signal from the I/O devices 2210-1 to 2210-M via the I/O bus 2160A.

The I/O devices 2210-1 to 2210-M transmit the interrupt signal to the host 2100A after an I/O command received from the host 2100A is processed.

The interrupt signal transmitted by the I/O devices 2210-1 to 2210-M is transmitted to the processor 2110A via the I/O bridge 2140A and the I/O controller 2130A.

The processor 2110A processes the following adaptive interrupt by executing the program (i.e., AIPM_SW; 2120A-1) stored in the memory 2120A.

The processor 2110A performs an operation of setting the I/O device to the adaptive masking mode when at least one factor value regarding the workload of the host 2100A exceeds the first threshold condition, an operation of performing an interrupt masking process when a time interval between I/O submission events of the I/O device 200A that is set to the adaptive masking mode is less than the first threshold value, and an operation of processing a response to a non-processed interrupt, which has not been processed in the time period where the interrupt masking process is performed, in the thread where the I/O submission event occurs.

The processor 2110A performs an operation of comparing the number of generated interrupt signals INT respectively received from the I/O devices 2210-1 to 2210-M per unit of elapsed time with the second threshold value and an operation of setting the I/O device 2210-K to the adaptive masking mode when the number of generated interrupt signals INT received from the I/O device 2210-K per unit of elapsed time exceeds the second threshold value. As another example, the processor 2110A may perform an operation of setting the I/O device 2210-K to the adaptive masking mode when at least one of a workload, consumed power, and detected temperature exceeds the first threshold condition.

The processor 2110A performs an operation of setting the I/O device 2210-K, which is in the adaptive masking mode, to an interrupt masking enable state or to remain in the interrupt masking enable state when an I/O submission event occurs. In addition, the processor 2110A performs an operation of setting the I/O device 2210-K to an interrupt masking disable state when an $(N+1)^{th}$ I/O submission event does not occur in a time period from a point of time when an $N^{th}$ I/O submission event occurs (where, N is an integer equal to or greater than 1) to a threshold time point. When the I/O device is in the interrupt masking disable state, the interrupt masking process is skipped.

The processor 2110A performs an operation of setting the I/O device 2210-K to the interrupt masking enable state again when the I/O submission event with regard to the I/O device 2210-K occurs after a state of the I/O device 2210-K is set to the interrupt masking disable state.

The processor 2110A ignores an interrupt signal INT received from the I/O device 2210-K that is set to the interrupt masking enable state. That is, switching to an interrupt context is blocked in response to the interrupt signal INT received from the I/O device 2210-K that is set to the interrupt masking enable state.

The processor 2110A performs an operation of processing, in a non-masking mode, an interrupt in response to the interrupt signal INT generated by the I/O device 2210-K that remains in the interrupt masking disable state. That is, after being switched to the interrupt context, the processor 2110A performs an interrupt process routine in response to the interrupt signal INT received from the I/O device 2210-K that is set to the interrupt masking disable state.

The processor 2110A performs an operation of switching the I/O device 2210-K to a non-masking mode from the adaptive masking mode when one or more factor values with regard to the workload of the host 2100A are within the second threshold condition after the I/O device 2210-K is set to the adaptive masking mode. In detail, when the number of interrupts generated per unit of elapsed time by the I/O device 2210-K that is set to the adaptive masking mode is less than the third threshold value, the mode of the I/O device 2210-K is switched from the adaptive masking mode to the non-masking mode. Here, the non-masking mode is a mode in which a masking process is not performed for the interrupt signal.

Then, in the thread context where the I/O submission event occurs, the processor 2110A performs a task of inserting a command regarding the I/O submission event into a submission queue and a task of processing a non-processed response to an internal interrupt of the I/O device 2210-K according to the interrupt masking process. For example, in the thread context where the I/O submission event occurs, the processor 2110A performs the task of inserting the command regarding the I/O submission event into the submission queue and then the task of processing the non-processed response to the internal interrupt of the I/O device 2210-K which is stored in a completion queue in the same context as above.

Figure 8:
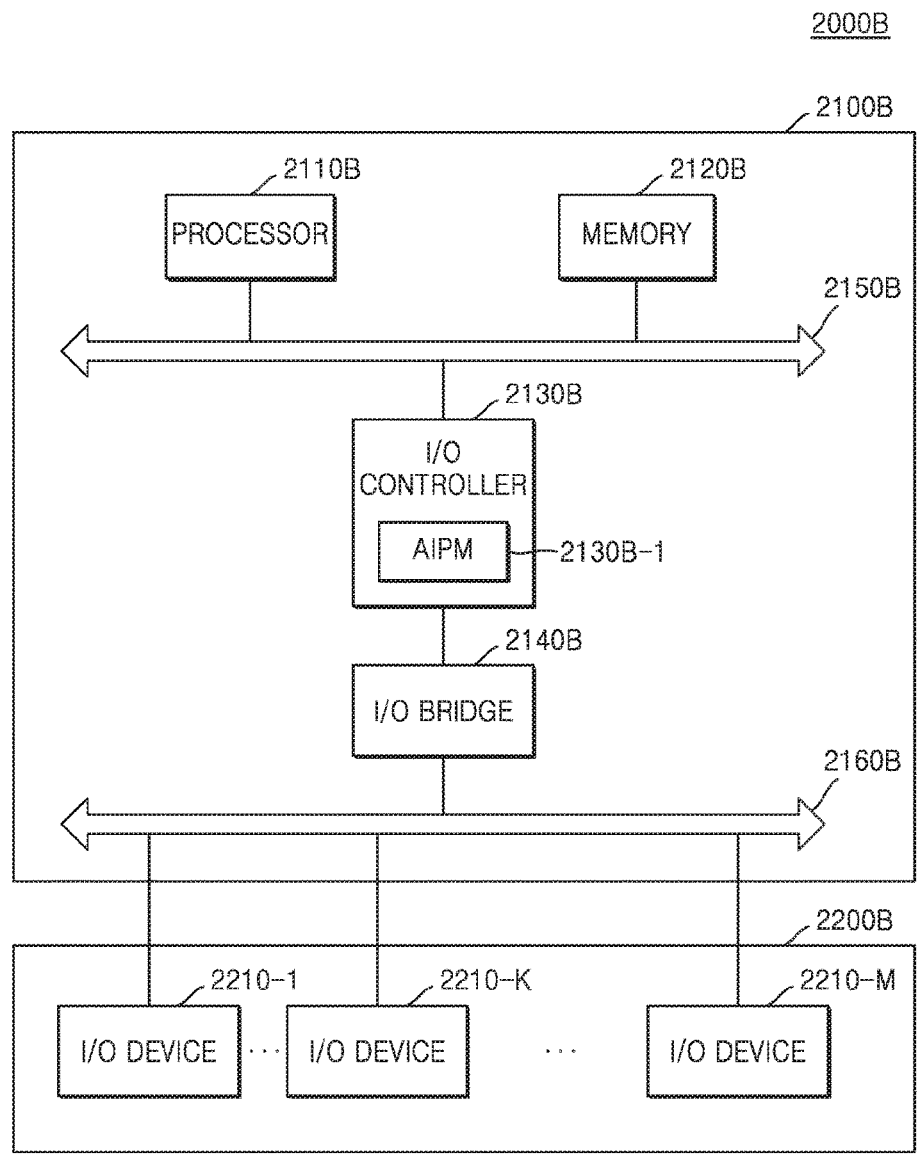
FIG. 8 illustrates another example of a structure of a computing system according to some example embodiments.

FIG. 8 illustrates another example of a structure of a computing system 2000B according to some example embodiments.

As illustrated in FIG. 8, the computing system 2000B may include a host 2100B and an I/O device block 2200B.

The host 2100B includes a processor 2110B, a memory 2120B, an I/O controller 2130B, an I/O bridge 2140B, a host bus 2150B, and an I/O bus 2160B. The I/O device block 2200B includes I/O devices 2210-1 to 2210-M.

In the computing system 2000B of FIG. 8, the I/O controller 2130B includes an AIPM 2130B-1. In some example embodiments, the AIPM 2130B-1 includes a processor. The processor 2110B may be referred to as a "first processor" and the processor included in the AIPM 2130B-1 may be referred to as a "second processor." For reference, in the computing system 2000A, an adaptive interrupt is processed by using the program AIPM_SW 2120A-1 stored in the memory 2120A.

The processor 2110B and the I/O controller 2130B which are different from those of FIG. 7 will be described.

The AIPM 2130B-1 included in the I/O controller 2130B may include software or hardware used to perform the operations according to the flowcharts of FIGS. 23 to 26.

The AIPM 2130B-1 performs an operation of setting the I/O device to the adaptive masking mode when at least one factor value regarding the workload of the host 2100B exceeds the first threshold condition that is initially set, an operation of performing an interrupt masking process when a time interval between I/O submission events of the I/O device that is set to the adaptive masking mode is less than the first threshold value, and an operation of processing a response to a non-processed interrupt, which has not been processed in the time period where the interrupt masking process is performed, in the thread where the I/O submission event occurs. The AIPM 2130B-1 performs an operation of setting the I/O device to the adaptive masking mode when at least one factor value regarding the workload of the host 2100B exceeds the first threshold condition that is initially set and an operation of performing the interrupt masking process when the time interval between the I/O submission events of the I/O device that is set to the adaptive masking mode is less than the first threshold value. An operation of processing the response to the non-processed interrupt, which has not been processed in the time period where the interrupt masking process, in the thread where the I/O submission event occurs may be performed by the host 2110B.

The AIPM 2130B-1 performs an operation of comparing the number of generated interrupt signals INT respectively received from the I/O devices 2210-1 to 2210-M per unit of elapsed time with the second threshold value and an operation of setting the I/O device 2210-K to the adaptive masking mode when the number of generated interrupt signals INT received from the I/O device 2210-K per unit of elapsed time exceeds the second threshold value. As another example, the AIPM 2130B-1 may perform an operation of setting the I/O device 2210-K to the adaptive masking mode when at least one of a workload, consumed power, and detected temperature exceeds the first threshold condition.

The AIPM 2130B-1 performs an operation of setting the I/O device 2210-K, which is in the adaptive masking mode, to the interrupt masking enable state or to remain in the interrupt masking enable state when an I/O submission event occurs. In addition, the AIPM 2130B-1 performs an operation of setting the I/O device 2210-K to the interrupt masking disable state when an $(N+1)^{th}$ I/O submission event does not occur in a time period from a point of time when an $N^{th}$ I/O submission event occurs (where, N is an integer equal to or greater than 1) to a threshold time point. In the interrupt masking disable state, the interrupt masking process is skipped.

The AIPM 2130B-1 performs an operation of setting the I/O device 2210-K to the interrupt masking enable state again when the I/O submission event with regard to the I/O device 2210-K is received from the processor 2100B after the state of the I/O device 2210-K is set to the interrupt masking disable state.

The AIPM 2130B-1 performs a masking process for the interrupt signal INT received from the I/O device 2210-K that is set to the interrupt masking enable state. That is, the AIPM 2130B-1 prevents the interrupt signal INT received from the I/O device 2210-K that is set to the interrupt masking enable state from being output to the processor 2110B.

The AIPM 2130B-1 transmits, to the processor 2110B, the interrupt signal INT generated by the I/O device 2210-K that remains in the interrupt masking disable state. Accordingly, after being switched to the interrupt context, the processor 2110B performs the interrupt process routine in response to the interrupt signal INT received from the I/O device 2210-K that is set to the interrupt masking disable state.

The AIPM 2130B-1 performs an operation of switching the I/O device 2210-K to the non-masking mode from the adaptive masking mode when one or more factor values with regard to the workload of the host 2100B are within the second threshold condition after the I/O device 2210-K is set to the adaptive masking mode. In detail, when the number of interrupts generated per unit of elapsed time by the I/O device 2210-K that is set to the adaptive masking mode is less than the third threshold value, the mode of the I/O device 2210-K is switched from the adaptive masking mode to the non-masking mode.

Then, in the thread context where the I/O submission event occurs, the AIPM 2130B-1 performs the task of inserting the command regarding the I/O submission event into the submission queue and the task of processing the non-processed response to the internal interrupt of the I/O device 2210-K according to the interrupt masking process. As another example, the in the thread context where the I/O submission event occurs, the processor 2110B performs the task of inserting the command regarding the I/O submission event into the submission queue and then the task of processing the non-processed response to the internal interrupt of the I/O device 2210-K which is stored in the completion queue in the same context as above.

Figure 9:
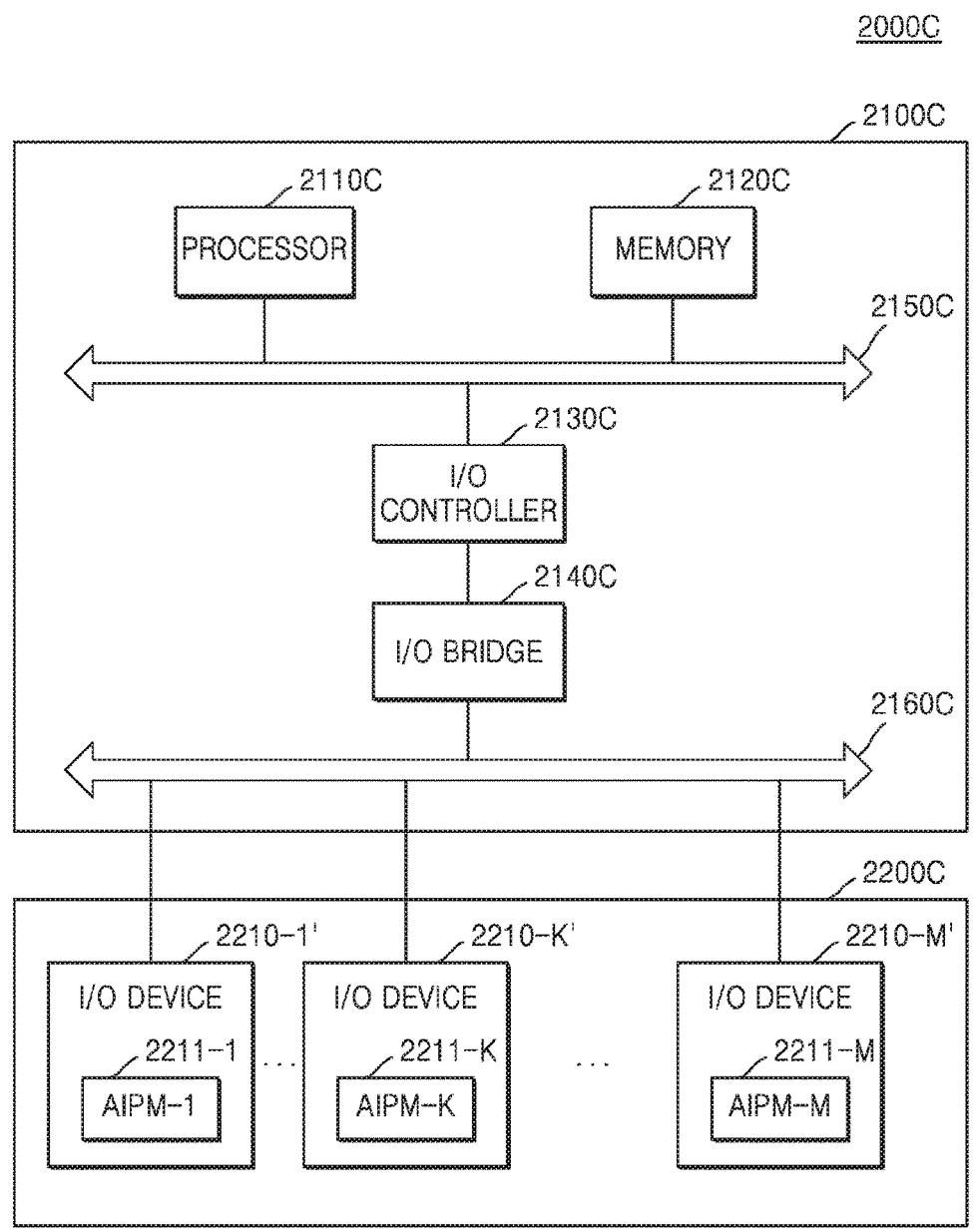
FIG. 9 illustrates another example of a structure of a computing system according to some example embodiments.

FIG. 9 illustrates another example of a structure of a computing system 2000C according to some example embodiments.

As illustrated in FIG. 9, the computing system 2000C includes a host 2100C and an I/O device block 2200C.

The host 2100C includes a processor 2110C, a memory 2120C, an I/O controller 2130C, an I/O bridge 2140C, a host bus 2150C, and an I/O bus 2160C. The I/O device block 2200C includes I/O devices 2210-1' to 2210-M'.

In the computing systems 2000A and 2000B of FIGS. 7 and 8, the hosts 2100A and 2100B include the program AIPM_SW; 2120A-1 for processing an adaptive interrupt or the AIM 2130B-1. On the contrary, in the computing system 2000C, AIPM-1 to AIPM-M 2211-1 to 2211-M are respectively included in the I/O devices 2210-1' to 2210-M'.

Basic operations of components forming the host 2100C of FIG. 9 are the same as those described with reference to FIGS. 7 and 8, and thus repeated descriptions thereof will be omitted.

The AIPM-1 2211-1 to AIPM-M 2211-M respectively included in the I/O devices 2210-1' to 2210-M' operate as follows.

For convenience, operations performed by the AIPM-K 2211-K included in the I/O device 2210-K' will be described.

The AIPM-K 2211-K supports an operation of setting the I/O device 2210-K' to the adaptive masking mode when at least one factor value regarding the workload exceeds the first threshold condition, an operation of performing an interrupt masking process when a time interval between I/O submission events of the I/O device 200A that is set to the adaptive masking mode is less than the first threshold value, and an operation of processing a response to a non-processed interrupt, which has not been processed in the time period where the interrupt masking process is performed, in the thread where the I/O submission event occurs. As another example, the AIPM-K 2211-K supports an operation of setting the I/O device 2210-K' to the adaptive masking mode when at least one factor value regarding the workload exceeds the first threshold condition that is initially set and an operation of performing the interrupt masking process when the time interval between the I/O submission events of the I/O device 2210-K' that is set to the adaptive masking mode is less than the first threshold value. An operation of processing the response to the non-processed interrupt, which has not been processed in the time period where the interrupt masking process, in the thread where the I/O submission event occurs may be supported by the processor 2110C of the host 2100C.

The AIPM-K 2211-K performs an operation of setting the I/O device 2210-K' to the adaptive masking mode when the number of generated internal interrupt signal INT_IN according to events processed by the I/O device 2210-K' per unit of elapsed time exceeds the second threshold value.

The AIPM-K 2211-K may perform an operation of setting the I/O device 2210-K' to the adaptive masking mode when at least one of a workload, consumed power, and detected temperature exceeds the first threshold condition.

The AIPM-K 2211-K performs an operation of setting the I/O device 2210-K', which is in the adaptive masking mode, to the interrupt masking enable state or to remain in the interrupt masking enable state when an I/O submission event is received from the host 2100C. In addition, the AIPM-K 2211-K may perform an operation of setting the I/O device 2210-K' to the interrupt masking disable state when an $(N+1)^{th}$ I/O submission event is not received in the time period from a point of time when an $N^{th}$ I/O submission event occurs (where, N is an integer equal to or greater than 1) to a threshold time point. In the interrupt masking disable state, the interrupt masking process is skipped.

The AIPM-K 2211-K performs an operation of setting the I/O device 2210-K' to the interrupt masking enable state again when the I/O submission event is received from the host 100B after the I/O device 2210-K' is set to the interrupt masking disable state.

The AIPM-K 2211-K prevents the internal interrupt signal INT_IN generated by the I/O device 2210-K' from being output to the host 2100C. The AIPM-K 2211-K allows the internal interrupt signal INT_IN generated by the I/O device 2210-K', which is set to the interrupt masking disable state, to be output to the host 2100C. That is, an external interrupt signal INT_EX output from the I/O device 2210-K' to the host 2100C becomes the internal interrupt signal INT_IN generated by the I/O device 2210-K' that is set to the interrupt masking disable state.

The AIPM-K 2211-K performs an operation of switching the mode of the I/O device 2210-K' to the non-masking mode from the adaptive masking mode when one or more factor values with regard to the workload of the host 2100C are within the second threshold condition after the I/O device 2210-K' is set to the adaptive masking mode. In detail, when the number of interrupts generated per unit of elapsed time by the I/O device 2210-K' that is set to the adaptive masking mode is less than the third threshold value, the mode of the I/O device 2210-K' is switched from the adaptive masking mode to the non-masking mode.

The host 2100C performs an operation of processing an interrupt based on the interrupt signal INT received from the I/O device 2210-K'. As described above, the interrupt signal INT received from the I/O device 2210-K' is the external interrupt signal INT_EX output from the I/O device 2210-K' that is set to the interrupt masking disable state. For example, when receiving the interrupt signal INT, the processor 2110C of the host 2100C stops execution of the context currently being processed and performs interrupt process routine by switching the context to the interrupt context.

In the thread context where the I/O submission event with regard to the I/O device 2210-K' that is set to the adaptive masking mode occurs, the processor 2110C supports a function for performing a task of inserting a command regarding the I/O submission event into a submission queue and a task of processing a non-processed response to an internal interrupt of the I/O device 2210-K' according to the interrupt masking process. For example, in the thread context where the I/O submission event with regard to the I/O device 2210-K' occurs, the host 2100C performs the task of inserting the command regarding the I/O submission event into the submission queue and then the task of processing the non-processed response to the internal interrupt of the I/O device 2210-K' which is stored in a completion queue in the same context as above.

Figure 10:
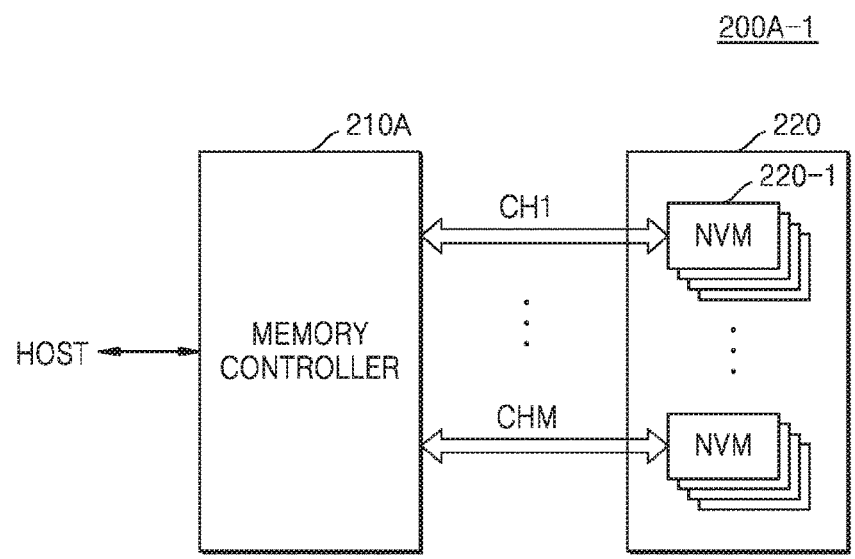
FIG. 10 illustrates an example of I/O devices of FIGS. 5, 7, and 8.

FIG. 10 illustrates an example of the I/O devices 200A or 2210-1 to 2210-M of FIGS. 5, 7, and 8.

FIG. 10 illustrates a block diagram of SSD 200A-1 that may be an example of the I/O devices 200A or 2210-1 to 2210-M of FIGS. 5, 7, and 8.

Referring to FIG. 10, the SSD 200A-1 includes a memory controller 210A and a memory device 220.

The memory controller 210A may perform an operation of controlling the memory device 220 based on a command received from a host. The memory controller 210A controls programming (or write), read, and erase operations on the memory device 220 connected via channels CH1 to CHM according to the command received from the host. The memory controller 210A transmits an interrupt signal to the host after operations regarding the command received from the host are completed. That is, after operation regarding an internal event in the SSD 200A-1 according to the command received from the host is completed, an interrupt signal for notifying the completion is transmitted to the host.

The memory device 220 may include one or more non-volatile memory chips NVM 220-1. The non-volatile memory chips NVM 220-1 applied to the memory device 220 may include a flash memory chip, a phase change random access memory (PRAM) chip, a Ferroelectric RAM (FRAM) chip, a Magnetic RAM (MRAM), or the like. As another example, the memory device 220 may be a combination of at least one non-volatile memory chip and at least one volatile memory chip or may be a combination of at least two types of non-volatile memory chips.

Figure 11:
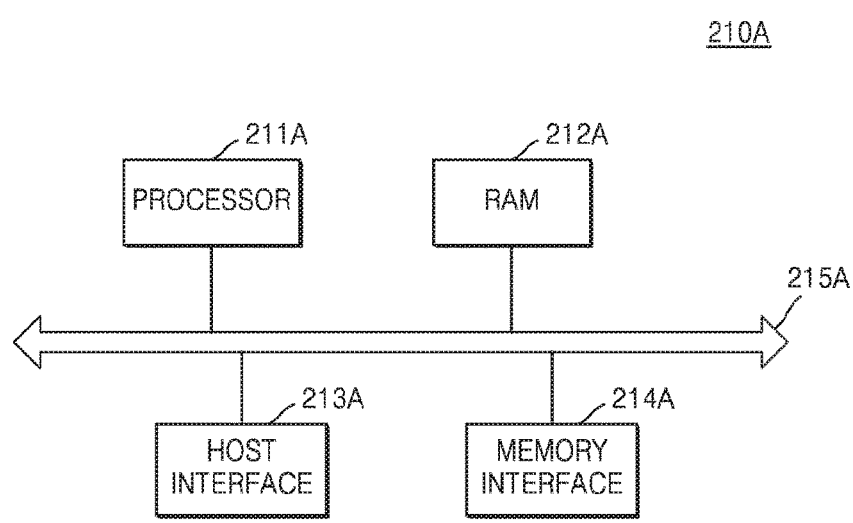
FIG. 11 illustrates a detailed structure of a memory controller of FIG. 10.

FIG. 11 illustrates a detailed structure of the memory controller 210A of FIG. 10.

As illustrated in FIG. 11, the memory controller 210A includes a processor 211A, RAM 212A, a host interface 213A, a memory interface 214A, and a bus 215A.

Components of the memory controller 210A are electrically connected to each other via the bus 215A.

The processor 211A may control operations of the SSD 200A-1 overall by using program codes and data stored in the RAM 212A. When the SSD 200A-1 is initialized, the processor 211A may read program codes and data necessary to control the operations of the SSD 200A-1 stored in the memory device 220 and may load the same onto the RAM 212A.

The processor 211A may perform read operation or write operation according to the command received from the host. The processor 211A generates an internal interrupt signal after completing the read operation or the write operation according to the command received from the host. The internal interrupt signal is transmitted to the host via the host interface 213A. Accordingly, an external interrupt signal output from the SSD 200A-1 to the host is the same as the internal interrupt signal.

Data received from the host via the host interface 213A or data received from the memory device 220 via the memory interface 214A is stored in the RAM 212A. Also, data processed by the processor 211A may be stored in the RAM 212A.

The host interface 213A includes a data exchange protocol with the host connected to the memory controller 210A and is an interface between the memory controller 210A and the host. The host interface 213A may be embodied as an ATA interface, a SATA interface, a Parallel Advanced Technology Attachment (PATA) interface, a Universal Serial Bus (USB) interface, a Serial Attached Small Computer System (SAS) interface, a SCSI interface, an eMMC interface, a UFS interface, a PCI interface, and a PCIe interface. However, the host interface 213A is not limited thereto. The host interface 213A may receive a command or data from the host or transmit data to the host according to the control of the processor 211A. Also, the host interface 213A may transmit an interrupt signal to the host according to the control of the processor 211A.

The memory interface 214A is electrically connected to the memory device 220. The memory interface 214A may transmit a command, an address, and data to the memory device 220 or may receive data from the memory device 220 according to the control of the processor 211A. The memory interface 214A may support NAND flash memory or NOR flash memory. The memory interface 214A may perform software or hardware interleave operations through multiple channels.

Figure 12:
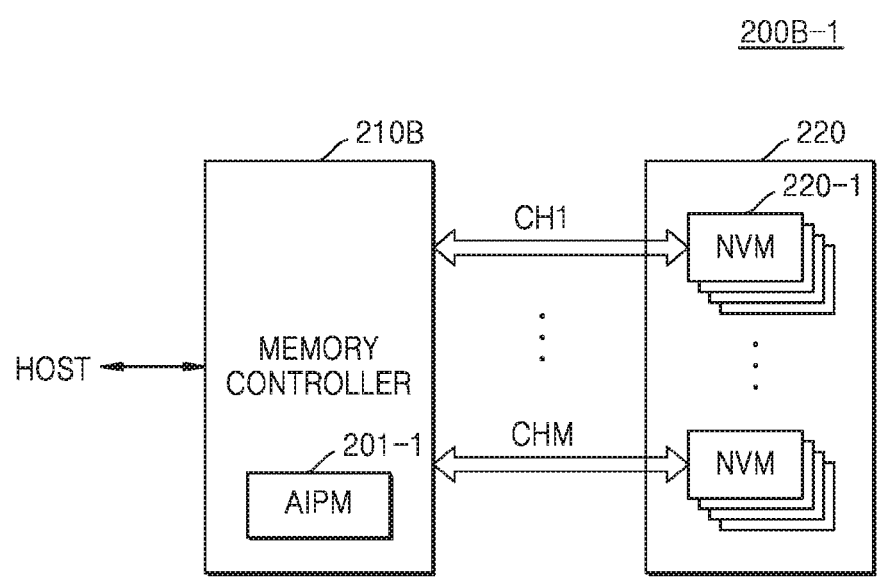
FIG. 12 illustrates an example of I/O devices of FIGS. 6 and 9.

FIG. 12 illustrates an example of the I/O devices 200B or 2210-1' to 2210-M' of FIGS. 6 and 9.

FIG. 12 illustrates a block diagram of SSD 200B-1 that may be an example of the I/O devices 200B or 2210-1' to 2210-M' of FIGS. 6 and 9.

Referring to FIG. 12, the SSD 200B-1 includes a memory controller 210B and a memory device 220.

The memory controller 210B may control the memory device 220 based on a command received from a host. The memory controller 210B controls program (or write), read, and erase operations on the memory device 220 connected through multiple channels CH1 to CHM according to a command received from the host.

The memory controller 210B includes an AIPM 201-1. The AIPM 201-1 may include software or hardware used to perform the operations according to the flowcharts of FIGS. 23, 24, 25, and 26.

The memory controller 210B may perform the following operations based on the AIPM 201-1.

The AIPM 201-1 supports an operation of setting the SSD 200B-1 to the adaptive masking mode when at least one factor value regarding the workload of the SSD 200B-1 exceeds the first threshold condition, an operation of performing an interrupt masking process when a time interval between I/O submission events, which is received by the SSD 200B-1 in a time period where the SSD 200B-1 is set to the adaptive masking mode, is less than the first threshold value, and an operation of processing a response to a non-processed interrupt, which has not been processed in the time period where the interrupt masking process is performed, in the thread where the I/O submission event occurs. As another example, the AIPM 201-1 is designed to support an operation of setting the SSD 200B-1 to the adaptive masking mode when at least one factor value regarding the workload of the SSD 200B-1 exceeds the first threshold condition that is initially set and an operation of performing the interrupt masking process when the time interval between the I/O submission events of the I/O device that is set to the adaptive masking mode is less than the first threshold value. An operation of processing the response to the non-processed interrupt, which has not been processed in the time period where the interrupt masking process, in the thread where the I/O submission event occurs may be supported by the host.

The AIPM 201-1 performs an operation of setting the SSD 200B-1 to the adaptive masking mode when the number of generated internal interrupt signals INT_IN according to an event processed by the SSD 200B-1 exceeds the second threshold value.

The AIPM 201-1 may perform an operation of setting the SSD200B-1 to the adaptive masking mode when at least one of the workload, the consumed power, and the detected temperature of the SSD 200B-1 exceeds the first threshold condition.

The AIPM 201-1 may perform an operation of setting the I/O device, which is in the adaptive masking mode, to the interrupt masking enable state or to remain in the interrupt masking enable state when an I/O submission event is received. The AIPM 201-1 performs an operation of setting the I/O device to the interrupt masking disable state when an $(N+1)^{th}$ I/O submission event is not received in the time period from a point of time when an $N^{th}$ I/O submission event (where, N is an integer equal to or greater than 1) is received to a threshold time point. In the interrupt masking disable state, the interrupt masking process is skipped.

The AIPM 201-1 performs an operation of setting the SSD 200B-1 to the interrupt masking enable state again when the I/O submission event is received from the host after a state of the SSD 200B-1 is set to the interrupt masking disable state. Here, reception of the I/O submission event from the host means that a command is received from the host.

The AIPM 201-1 prevents the internal interrupt signal INT_IN, which is generated by the SSD 200B-1, from being output to the host in the time period where the SSD 200B-1 is set to the interrupt masking enable state. In the time period where the SSD 200B-1 is set to the interrupt masking disable state, the AIPM 201-1 allows the internal interrupt signal INT_IN, which is generated by the SSD 200B-1, to be output to the host. That is, an external interrupt signal INT_EX output to the host 100B by the SSD 200B-1 becomes the internal interrupt signal INT_IN generated by the SSD 200B-1 in the time period where the SSD 200B-1 is set to the interrupt masking disable state. Here, the internal interrupt signal INT_IN is generated after operation regarding a command received from the host is completed.

The AIPM 201-1 performs an operation of switching the mode of the SSD 200B-1 from the adaptive masking mode to the non-masking mode when at least one factor value regarding the workload of the SSD 200B-1 that is set to the adaptive masking mode is within the second threshold condition. In detail, when the number of internal interrupts INT_IN generated per unit of elapsed time by the SSD200B-1 that is set to the adaptive masking mode is less than the third threshold value, the mode of the SSD 200B-1 is switched from the adaptive masking mode to the non-masking mode.

The memory device 220 has been described with reference to FIG. 10, and thus repeated descriptions thereof will be omitted.

Figure 13:
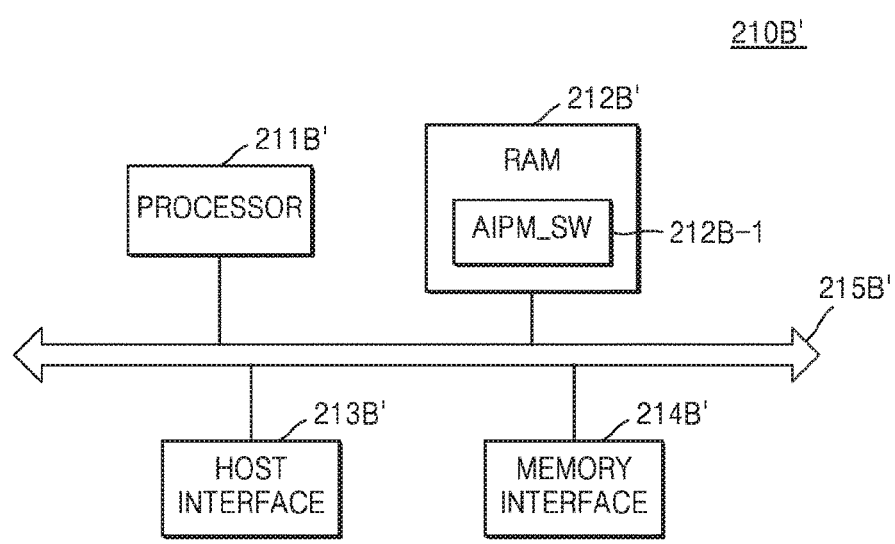
FIG. 13 illustrates an example of a memory controller of FIG. 12.

FIG. 13 illustrates an example of the memory controller 210B' of FIG. 12.

As illustrated in FIG. 13, the memory controller 210B' includes a processor 211B', RAM 212B', a host interface 213B', a memory interface 214B', and a bus 215B'.

Components forming the memory controller 210B' are connected to each other via the bus 215B'.

The processor 211B' may control operations of the SSD 200B-1 overall by using program codes and data stored in the RAM 212B'. When the SSD 200B-1 is initialized, the processor 211B' may read program codes and data necessary to control the operations of the SSD 200B-1 stored in the memory device 220 and may load the same onto the RAM 212B'. In particular, a software program AIPM_SW 212B-1 for performing the method of processing the adaptive interrupt is stored in the RAM 212B'.

Data received from the host via the host interface 213B' or data received from the memory device 220 via the memory interface 214B' is stored in the RAM 212B'. Alternatively, data processed by the processor 211B' may be stored in the RAM 212B'.

The processor 211B' processes the following adaptive interrupts by executing the software program AIPM_SW 212B-1 stored in the RAM 212B'.

The processor 211B' performs an operation of setting the SSD 200B-1 to the adaptive masking mode when at least one factor value regarding the workload of the SSD 200B-1 exceeds the first threshold condition, an operation of performing an interrupt masking process when a time interval between I/O submission events of the SSD 200B-1 that is set to the adaptive masking mode is less than the first threshold value, and an operation of processing a response to a non-processed interrupt which has not been processed during the time period where the interrupt masking process is performed, in the thread where the I/O submission event occurs.

The processor 211B' may perform an operation of setting the SSD 200B-1 to the adaptive masking mode when the number of interrupt signals INT generated per unit of elapsed time exceeds the second threshold value. As another example, the processor 211B' may perform an operation of setting the SSD 200B-1 to the adaptive masking mode when at least one of the workload, the consumed power, and the detected temperature of the SSD 200B-1 exceeds the first threshold condition.

The processor 211B' performs an operation of setting the SSD 200B-1, which is in the adaptive masking mode, to the interrupt masking enable state or to remain in the interrupt masking enable state when an I/O submission event occurs. In addition, the processor 211B' performs an operation of setting the SSD 200B-1 to the interrupt masking disable state when an $(N+1)^{th}$ I/O submission event does not occur in a time period from a point of time when an $N^{th}$ I/O submission event occurs (where, N is an integer equal to or greater than 1) to a threshold time point. In the interrupt masking disable state, the interrupt masking process is skipped.

The processor 211B' performs an operation of setting the SSD 200B-1 to the interrupt masking enable state again when the I/O submission event is received after a state of the SSD 200B-1 is set to the interrupt masking disable state.

The processor 211B' prevents an interrupt signal from being output to the host when the SSD 200B-1 is set to the interrupt masking enable state. The processor 211B' allows the interrupt signal to be output to the host when the SSD 200B-1 is set to the interrupt masking disable state.

The processor 211B' performs an operation of switching a mode of the SSD 200B-1 to a non-masking mode from the adaptive masking mode when one or more factor values with regard to the workload of the SSD 200B-1 are within the second threshold condition after the SSD 200B-1 is set to the adaptive masking mode. In detail, when the number of interrupts, which are generated per unit of elapsed time after the SSD 200B-1 is set to the adaptive masking mode, is less than the third threshold value, the mode of the SSD 200B-1 is switched from the adaptive masking mode to the non-masking mode.

The host interface 213B' and the memory interface 214B' are substantially the same as the host interface 213B and the memory interface 214A of FIG. 11, and thus descriptions thereof will be omitted.

Figure 14:
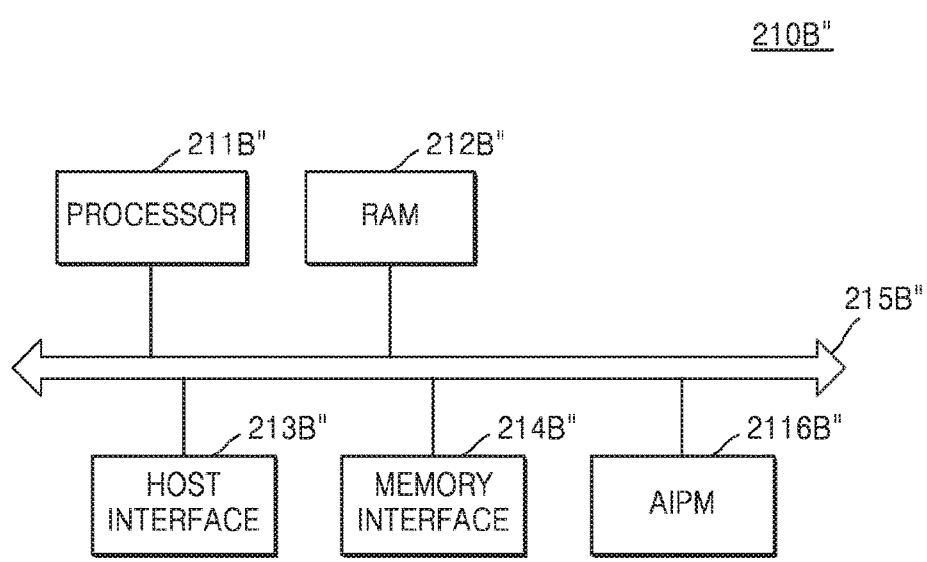
FIG. 14 illustrates another example of the memory controller of FIG. 12.

FIG. 14 illustrates another example of a memory controller 210B" of FIG. 12.

As illustrated in FIG. 14, the memory controller 210B" includes a processor 211B", RAM 212B", a host interface 213B", a memory interface 214B", a bus 215B", and an AIPM 2116B". AIPM 2116B" may include one or more of a processor and a memory.

Components of the memory controller 210B" are electrically connected to each other via the bus 215B".

The processor 211B" may control operations of the SSD 200B-1 overall by using program codes and data stored in the RAM 212B". When the SSD 200B-1 is initialized, the processor 211B" may read program codes and data necessary to control the operations of the SSD 200B-1 stored in the memory device 220 and may load the same onto the RAM 212A.

Data received from a host via the host interface 213B" or data received from the memory device 220 via the memory interface 214 B" is stored in the RAM 212 B". Also, data processed by the processor 211 B" may be stored in the RAM 212 B".

The AIPM 2116B" may include software or hardware used to perform an operation of processing an adaptive interrupt. The AIPM 2116B" may include an apparatus 10 for processing an adaptive interrupt illustrated in FIG. 18.

The AIPM 2116B" performs an operation of setting the SSD 200B-1 to the adaptive masking mode when at least one factor value regarding the workload of the SSD 200B-1 exceeds the first threshold condition that is initially set and an operation of performing an interrupt masking process when a time interval between I/O submission events of the SSD 200B-1 that is set to the adaptive masking mode is less than the first threshold value.

The AIPM 2116B" sets the SSD 200B-1 to the adaptive masking mode when the number of interrupt signals INT generated in processor 211B" per unit of elapsed time exceeds the second threshold value. As another example, the AIPM 2116B" may perform an operation of setting the SSD 200B-1 to the adaptive masking mode when at least one of the workload, the consumed power, and detected temperature of the SSD 200B-1 exceeds the first threshold value.

The AIPM 2116B" performs an operation of setting the SSD 200B-1, which is in the adaptive masking mode, to an interrupt masking enable state or to remain in the interrupt masking enable state when an I/O submission event occurs in the time period where the SSD 200B-1 is allowed to the adaptive masking mode. In addition, the processor 2110A performs an operation of setting the SSD 200B-1 to the interrupt masking disable state when an $(N+1)^{th}$ I/O submission event does not occur in the time period from the point of time when an $N^{th}$ I/O submission event occurs (where, N is an integer equal to or greater than 1) to the threshold time point. In the interrupt masking disable state, the interrupt masking process is skipped.

The AIPM 2116B" performs an operation of setting the SSD 200B-1 to the interrupt masking enable state again when the I/O submission event is received after a state of the SSD 200B-1 is set to the interrupt masking disable state.

The AIPM 2116B" prevents an interrupt signal from being output to the host when the SSD 200B-1 is set to the interrupt masking enable state. The AIPM 2116B" allows the interrupt signal to be output to the host when the SSD 200B-1 is set to the interrupt masking disable state.

The AIPM 2116B" performs an operation of switching a mode of the SSD 200B-1 to a non-masking mode from the adaptive masking mode when one or more factor values with regard to the workload of the SSD 200B-1 are within the second threshold condition after the SSD 200B-1 is set to the adaptive masking mode. In detail, when the number of interrupts, which are generated per unit of elapsed time after the SSD 200B-1 is set to the adaptive masking mode, is less than the third threshold value, the mode of the SSD 200B-1 is switched from the adaptive masking mode to the non-masking mode.

The host interface 213B" and the memory interface 214B" are substantially the same as the host interface 213A and the memory interface 214A of FIG. 11, and thus repeated descriptions thereof will be omitted.

Figure 15:
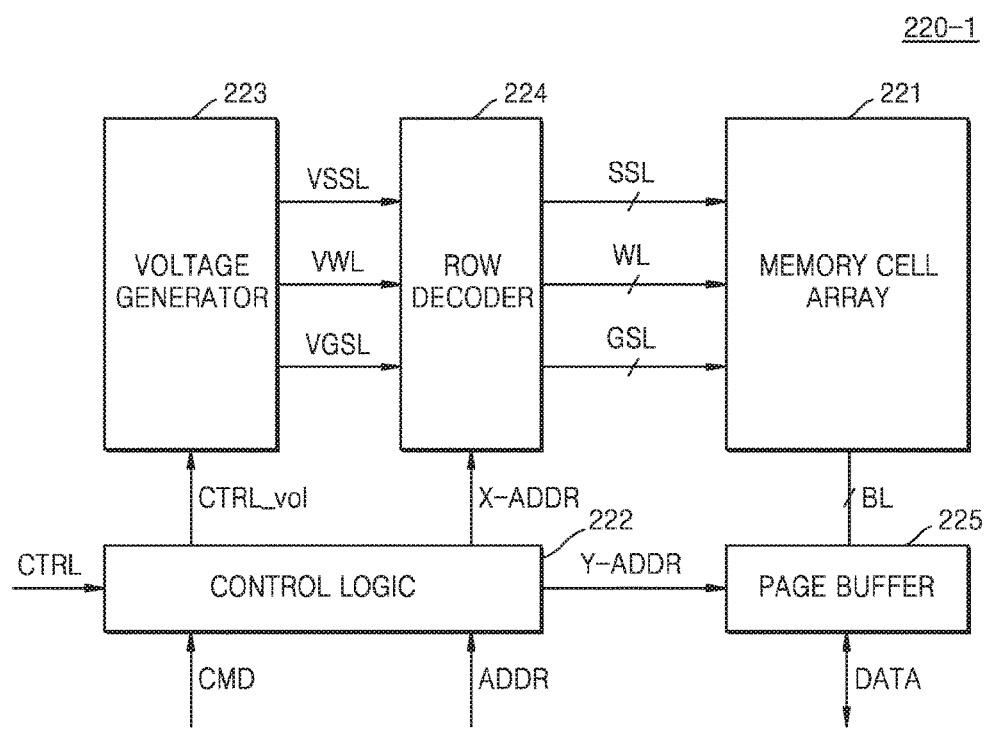
FIG. 15 illustrates an example of a structure of a nonvolatile memory chip of FIGS. 10 and 12.

FIG. 15 illustrates an example of a structure of the non-volatile memory chip NVM 220-1 of FIGS. 10 and 12.

Referring to FIG. 15, the non-volatile memory chip 220-1 may include a memory cell array 221, control logic 222, a voltage generator 223, a row decoder 224, and a page buffer 225. Hereinafter, components included in the non-volatile memory chip 220-1 will be described below.

The memory cell array 221 may be connected to string selection lines SSL, word lines WL, and ground selection lines GSL and may also be connected to bit lines BL. The memory cell array 221 may include memory cells MC of FIG. 17 arranged in areas where the word lines WL and the bit lines BL cross each other.

When an erase voltage is applied to the memory cell array 221, the memory cells MC are in an erase state, and when a program voltage is applied to the memory cell array 221, the memory cells MC are in a program state. In this case, each memory cell MC may be in one of the erase state and first to $n^{th}$ program states P1 to Pn, which are classified by a threshold voltage.

Here, n may be a natural number equal to or greater than 2. For example, when the memory cell MC is a 2-bit level cell, n may be equal to 3. As another example, when the memory cell MC is a 3-bit level cell, n may be equal to 7. As another example, when the memory cell MC is a 4-bit level cell, n may be equal to 15. The memory cells MC may include multi-level cells. However, the inventive concepts are not limited thereto, and the memory cells MC may include single-level cells.

The control logic 222 may output various control signals in order to write data on the memory cell array 221 or read data from the memory cell array 221 based on a command CMD, an address ADDR, and a control signal CTRL received from a memory controller. Thus, the control logic 222 may control operations in the non-volatile memory chip 220-1 overall.

The control signals output from the control logic 222 may be provided to the voltage generator 223, the row decoder 224, and the page buffer 225. In detail, the control logic 222 may provide a voltage control signal CTRL_vol to the voltage generator 223, a row address X_ADDR to the row decoder 224, and a column address Y_ADDR to the page buffer 225.

The voltage generator 223 may generate various voltages used to perform program, read, and erase operations on the memory cell array 221 based on the voltage control signal CTRL_vol. In detail, the voltage generator 223 may generate a first driving voltage VWL for driving the word lines WL, a second driving voltage VSSL for driving the string selection lines SSL, and a third driving voltage VGSL for driving the ground selection lines GSL.

In this case, the first driving voltage VWL may be a program voltage (or a write voltage), a read voltage, an erase voltage, a pass voltage, or a program verifying voltage. Also, the second driving voltage VSSL may be a string selection voltage, that is, an on or off voltage. Furthermore, the third driving voltage VGSL may be a ground selection voltage, that is, an on or off voltage.

The row decoder 224 is connected to the memory cell array 221 via the word lines WL and may activate some of the word lines WL in response to the row address X_ADDR received from the control logic 222. In detail, when a read operation is performed, the row decoder 224 may apply a read voltage to a selected word line WL and may apply a pass voltage to a non-selected word line WL.

When a program operation is performed, the row decoder 224 may apply a program voltage to a selected word line WL and may apply a pass voltage to a non-selected word line WL.

The page buffer 225 may be connected to the memory cell array 221 via the bit lines BL. In detail, when a read operation is performed, the page buffer 225 operates as a sense amplifier and thus may output data DATA stored in the memory cell array 221. When a program operation is performed, the page buffer 225 operates as a write driver and thus may input data DATA to be stored in the memory cell array 221.

Figure 16:
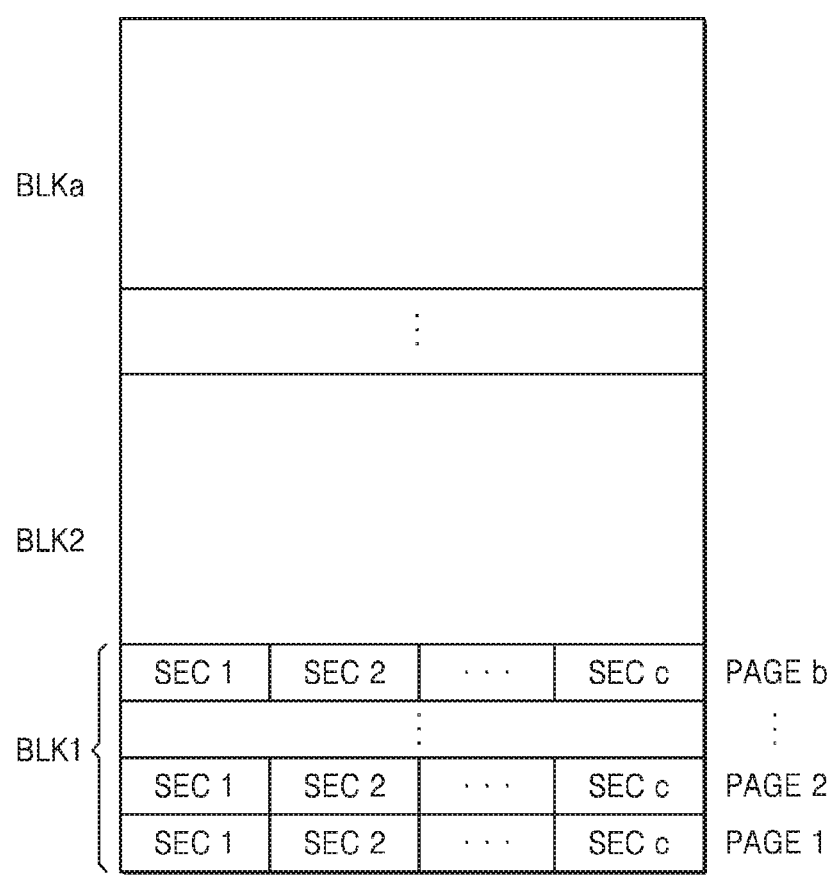
FIG. 16 illustrates an example of a memory cell array of FIG. 15.

FIG. 16 illustrates an example of the memory cell array 221 of FIG. 15.

Referring to FIG. 16, the memory cell array 221 may be a flash memory cell array. In this case, the memory cell array 221 includes memory blocks BLK1 to BLKa (where, a is an integer equal to or greater than 2), each of the memory blocks BLK1 to BLKa includes pages PAGE1 to PAGEb (where, b is an integer equal to or greater than 2), and each of the pages PAGE1 to PAGEb includes sectors SEC1 to SECc (where, c is an integer equal to or greater than 2). For convenience, FIG. 16 illustrates pages PAGE0 to PAGEb and sectors SEC1 to SECc of the memory block BLK1, but other memory blocks BLK2 to BLKa may have the same structure as the memory block BLK1.

Figure 17:
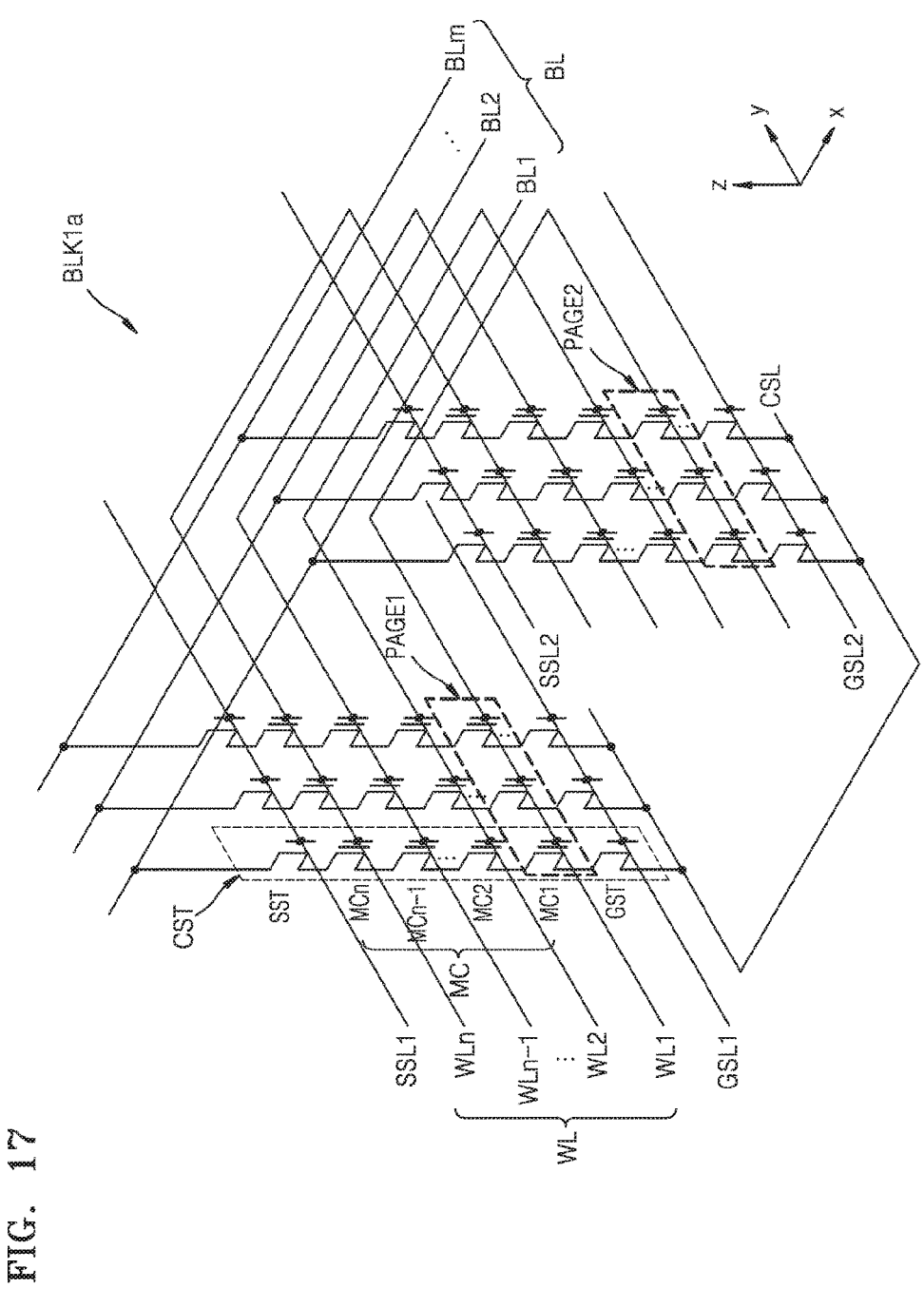
FIG. 17 illustrates a circuit diagram of a first memory block included in the memory cell array of FIG. 15.

FIG. 17 illustrates a circuit diagram of a first memory block BLK1a included in the memory cell array 221 of FIG. 16.

Referring to FIG. 17, the first memory block BLK1a may be a NAND flash memory having a vertical structure. In this case, each of the blocks BLK1 to BLKa of FIG. 16 may be embodied as illustrated in FIG. 17. In FIG. 17, a first direction will be referred to as an x direction, a second direction will be referred to as a y direction, and a third direction will be referred to as a z direction. However, the inventive concepts are not limited thereto, and the first to third directions may be changed.

The first memory block BLK1a may include cell strings CST, word lines WL, bit lines BL, ground selection lines GSL1 and GLS2, string selection lines SSL1 and SSL2, and common source lines CSL. Here, the number of cell strings CST, the number of word lines WL, the number of bit lines BL, the number of ground selection lines GSL1 and GLS2, and the number of string selection lines SSL1 and SSL2 may vary, depending on exemplary embodiments.

The cell strings CST may include string selection transistors SST that are connected in series between the bit lines BL and the common source lines CSL, memory cells MC, and ground selection transistors GST. However, the inventive concepts are not limited thereto. According to another exemplary embodiment, the cell strings CST may further include at least one dummy cell. According to another exemplary embodiment, the cell strings CST may also include at least two string selection transistors SST or at least two ground selection transistors GST.

Also, the cell strings CST may extend in the third direction (the z direction). In detail, the cell strings CST may extend in a direction perpendicular to a substrate (the z direction). Therefore, the memory block BLK1a including the cell strings CST may be referred to as a NAND flash memory in a vertical direction. As the cell strings CST extend in the direction perpendicular to the substrate (the z direction), an integration degree of the memory cell array 221 may be improved.

The word lines WL extend in the first and second directions (the x and y directions), and the word lines may be respectively connected to corresponding memory cells MC. Accordingly, the memory cells MC that are arranged to be adjacent to each other along the first and second directions (the x and y directions) at the same layer may be connected to the same word line WL. In detail, each word line WL is connected to a gate of the memory cell MC and may control the memory cell MC. In this case, the memory cells MC may store data, and may be programmed, read, or erased according to the control of the connected word line WL.

The bit lines BL may extend in the first direction (the x direction) and may connected to the string selection transistors SST. Accordingly, the string selection transistors SST that are arranged to be adjacent to each other along the first direction (the x direction) may be connected to the same bit line BL. In detail, each bit line BL may be connected to a drain of the string selection transistor SST.

String selection lines SSL1 and SSL2 extend in the second direction (the y direction) and may be connected to the string selection transistors SST. Accordingly, the string selection transistors SST that are arranged to be adjacent to each other along the second direction (the y direction) may be connected to the same string selection line SSL1 or SSL2. In detail, each string selection line SSL1 or SSL2 may be connected to a gate of the string selection transistor SST and may control the string selection transistor SST.

The ground selection lines GSL1 and GSL2 extend in the second direction (the y direction) and may be connected to the ground selection transistors GST. Accordingly, the ground selection transistors GST that are arranged to be adjacent to each other along the second direction (the y direction) may be connected to the same ground selection line GSL1 or GSL2. In detail, each ground selection line GSL1 or GSL2 may be connected to a gate of the ground selection transistor GST and may control the ground selection transistor GST.

In addition, the ground selection transistors GST included in respective cell strings CST may be connected to the common source lines CSL. In detail, the common source lines CSL may be connected to sources of the ground selection transistors GST.

The memory cells MC that are arranged to be adjacent to each other along the second direction (the y direction) and are connected to the same word line WL and the same string selection line SSL1 or SSL2 may be referred to as pages PAGE. For example, memory cells MC that are commonly connected to a first word line WL1 and a first string selection line SSL1 and are arranged to be adjacent to each other along the second direction (the y direction) may be referred to as a first page PAGE1. Also, memory cells MC that are commonly connected to the first word line WL1 and a second string selection line SSL2 and are arranged to be adjacent to each other along the second direction (the y direction) may be referred to as a second page PAGE2.

In order to perform the program operation on the memory cell MC, 0V may be applied to the bit lines BL, an on voltage may be applied to the string selection lines SSL, and an off voltage may be applied to the ground selection lines GSL. The on voltage may be equal to or greater than a threshold voltage of the string selection transistors SST in order to turn on the string selection transistors SST, and the off voltage may be smaller than a threshold voltage of the ground selection transistors GST in order to turn off the ground selection transistors GST. Also, a program voltage may be applied to selected memory cells MC, and a pass voltage may be applied to non-selected memory cells MC. When the program voltage is applied, charges may be injected into the memory cells MC through F-N tunneling. The pass voltage may be greater than a threshold voltage of the memory cells MC.

In order to perform the erase operation on the memory cell MC, an erase voltage may be applied to bodies of the memory cells MC, and 0V may be applied to the word lines WL. Accordingly, data stored in the memory cells MC may be erased at once.

Figure 18:
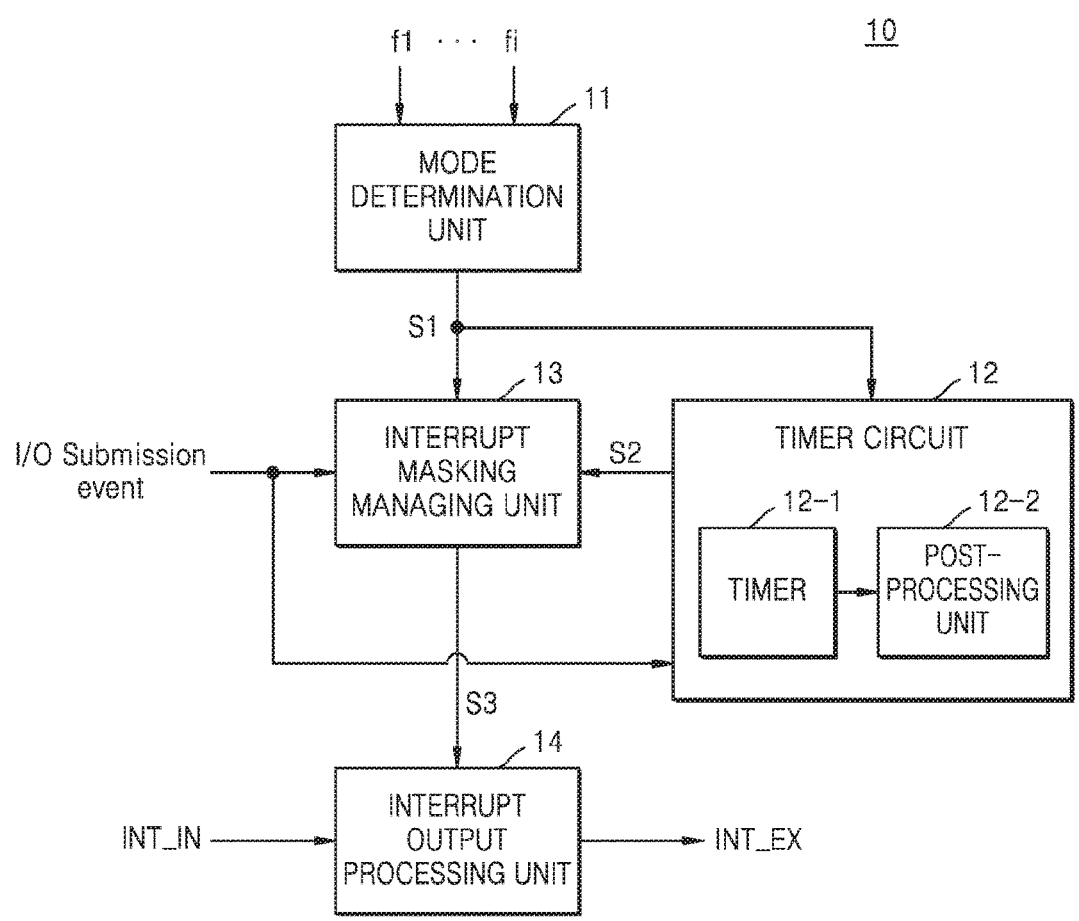
FIG. 18 illustrates an example of a structure of an apparatus for processing an adaptive interrupt according to some example embodiments.

FIG. 18 illustrates an example of a structure of the apparatus 10 for processing an adaptive interrupt according to some example embodiments.

FIG. 18 illustrates a block diagram of the apparatus 10 for processing an adaptive interrupt including devices included in the AIPMs 110, 210, 2130-1 or 2211-1 to 2211-N arranged in the host or I/O devices of the computing systems 1000A, 1000B, 2000B, and 2000C of FIGS. 5, 6, 8, and 9.

As illustrated in FIG. 18, the apparatus 10 for processing an adaptive interrupt includes a mode determination unit 11, a timer circuit 12, an interrupt masking managing unit 13, and an interrupt output processing unit 14.

The mode determination unit 11 determines whether to turn on/off the adaptive masking mode of an I/O device based on factor values f1 to fi regarding a workload of a system.

Figure 21:
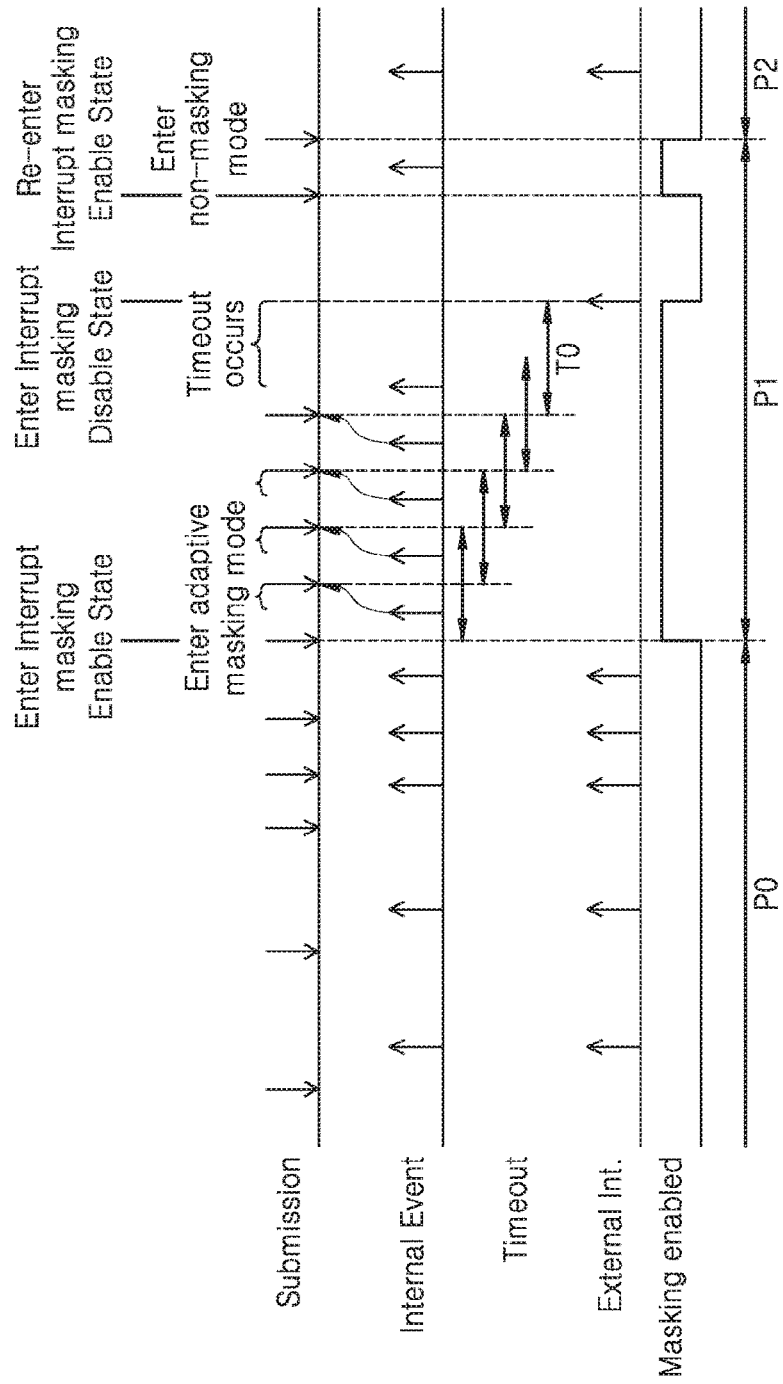
FIG. 21 illustrates a timing chart regarding main signals for explaining an operation of processing an adaptive interrupt, according to some example embodiments.

The mode determination unit 11 may calculate the number of interrupts generated per unit of elapsed time in each I/O device connected to the host, may generate an on signal for turning on the adaptive masking mode of an I/O device when the number of interrupts generated per unit of elapsed time in the I/O device exceeds a first threshold value, and may generate an off signal for turning off the adaptive masking mode of an I/O device when the calculated number of interrupts generated per unit of elapsed time in the I/O device is less than the first threshold value. The mode determination unit 11 may generate a mode determination signal 51 for determining to turn on the adaptive masking mode when at least one of the workload, consumed power, and a detected temperature of the system exceeds a threshold condition that is initially set or may generate a mode determination signal 51 for determining to turn off the adaptive masking mode when at least one of the workload, consumed power, and detected temperature of the system does not exceed the threshold condition. An off state of the adaptive masking mode is a non-masking mode and corresponds to a non-masking mode. It will be understood that turning an adaptive masking mode of an I/O device on or off may be referred to as selectively setting the I/O device to the adaptive masking mode. Referring to FIG. 21, time periods P0 and P2 correspond to the non-masking mode, and a time period P1 corresponds to the adaptive masking mode.

The timer circuit 12 includes a timer 12-1 and a post-processing unit 12-2.

The timer 12-1 measures a time from an initial setting value T_st whenever I/O submission events occur in the I/O device that is set to the adaptive masking mode.

The post-processing unit 12-2 generates a masking off control signal S2 when the measured time of the timer 12-1 reaches a target value T_tar. Accordingly, the post-processing unit 12-2 generates the masking off control signal S2 when an $(N+1)^{th}$ I/O submission event does not occur in the I/O device that is set to the adaptive masking mode in a time period from a point of time when an $N^{th}$ I/O submission event occurs (where, N is an integer equal to or greater than 1) to a threshold time point T_tar, that is, the target value T_tar.

Thus, the timer circuit 12 may perform an operation of measuring whether a time interval between I/O submission events of the I/O device that is set to the adaptive masking mode is equal to or less than a threshold interval.

Based on the mode determination signal 51 received from the mode determination unit 11, the interrupt masking managing unit 13 generates a masking signal S3 for switching the I/O device, which is in the adaptive masking mode, from the interrupt masking disable state to the interrupt masking enable state when an I/O submission event signal is received by the I/O device while in the interrupt masking disable state. Alternatively, in the interrupt masking enable state, the interrupt masking managing unit 13 generates a masking signal S3 for maintaining the interrupt masking enable state.

The interrupt masking managing unit 13 generates a masking signal S3 for switching the state of the I/O device from the interrupt masking enable state to the interrupt masking disable state when the masking off control signal S2 is received from the timer circuit 12. For example, when a masking off control signal S2 regarding the I/O device 2210-K is received from the timer circuit 12, the interrupt masking managing unit 13 generates a masking signal S3 for switching the state of the I/O device 2210-K from the interrupt masking enable state to the interrupt masking disable state.

Referring to FIG. 21, the I/O device is set to either the interrupt masking enable state or the interrupt masking disable state in the time period P1 of the adaptive masking mode, based on the masking signal S3. The state of the I/O device is switched to the interrupt masking disable state when the $(N+1)^{th}$ I/O submission event does not occur in the time period from the point of time when the $N^{th}$ I/O submission event occurs (where, N is an integer equal to or greater than 1) the threshold time point T_tar, that is, the target value T_tar. The start and stop points of the timeout duration T0 of FIG. 21 respectively correspond to the target value T_tar and the initial setting value T_st.

The interrupt output processing unit 14 selectively outputs interrupt signals INT_IN generated by respective I/O devices based on the masking signals S3 generated by the interrupt masking managing unit 13 for the I/O devices. In detail, the interrupt output processing unit 14 prevents the interrupt signals INT_IN generated by respective I/O devices from being output to the CPU (or the processor) of the host in a time period where the masking signal S3 is generated in the interrupt masking enable state. In addition, the interrupt output processing unit 14 allows the interrupt signals INT_IN generated by respective I/O devices to be output to the CPU (or the processor) of the host in a time period where masking signal S3 is generated in the interrupt masking disable state.

Therefore, an interrupt signal INT_EX output by the interrupt output processing unit 14 becomes the interrupt signal INT_IN input in the time period where the masking signal S3 is generated in the interrupt masking enable state.

Referring to FIG. 21, in a high time period of a masking enabled state which indicates the interrupt masking enable state, an output of an internal interrupt signal generated by the I/O device is blocked. The internal interrupt signal has the same meaning as an internal event signal. That is, although the internal interrupt signal is generated in the high time period of the masking enabled state which indicates the interrupt masking enable state, an external interrupt signal External Int. is not output. In a low time period of the masking enabled state which indicates the interrupt masking disable state, an internal interrupt signal is output as an external interrupt signal External Int.

Figure 19:
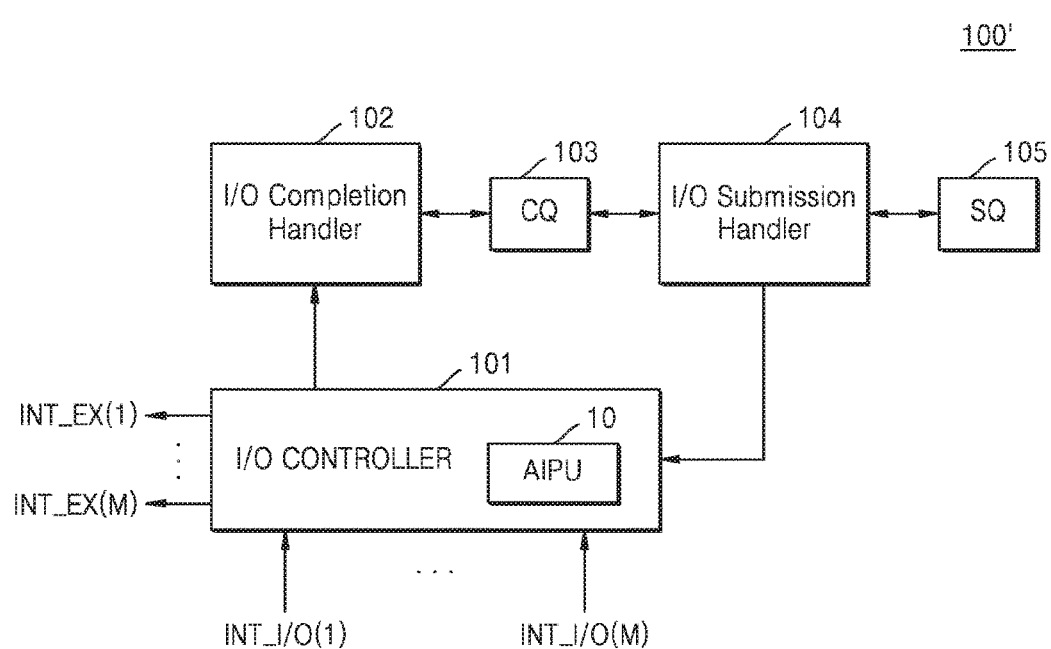
FIG. 19 illustrates a main structure of a host included in an apparatus for processing an adaptive interrupt according to some example embodiments.

FIG. 19 illustrates a main structure of a host 100' included in the apparatus 10 for processing an adaptive interrupt according to some example embodiments.

The host 100' includes an I/O controller 101, an I/O completion handler 102, a completion queue CQ 103, an I/O submission handler 104, and a submission queue SQ 105. The I/O controller 101 may include an adaptive interrupt processing module AIPM 10.

In a masking enable state, the I/O controller 101 blocks interrupt signals INT_I/O(1) to INT_I/O(M) which are respectively received from I/O devices connected to the host 100' through the apparatus 10 for processing an adaptive interrupt. That is, in a masking disable state, interrupt signals INT_EX(1) to INT_EX(M) output from the I/O controller 101 to the I/O devices become the interrupt signals INT_I/O(1) to INT_I/O(M) respectively received from the I/O devices.

The host 100' may perform interrupt processing based on the interrupt signals INT_EX(1) to INT_EX(M) output from the I/O controller 101. The host 100' may perform interrupt processing in an interrupt handler context based on the interrupt signals INT_EX(1) to INT_EX(M).

In the adaptive masking mode, the host 100' may process a response to a non-processed interrupt, which has not been processed in the masking enable state, by using the I/O submission handler 104.

Command information issued to the I/O device according to an I/O submission thread is inserted into the submission queue SQ 105. That is, the command information issued to the I/O device is stored in the submission queue SQ 105.

Command information that has been completely executed in the I/O device is stored in the completion queue CQ 103. The I/O completion handler 102 may receive, through the I/O controller 101, the command information that has been completely executed in the I/O device and may store the same in the completion queue CQ 103.

In the thread context where an I/O submission event occurs, the I/O submission handler 104 performs a task of inserting a command regarding the I/O submission event into the submission queue SQ 105 and a task of processing a response to a non-processed interrupt which has not been processed in the interrupt masking enable state.

The I/O submission handler 104 performs the task of inserting the command regarding the I/O submission event into the submission queue SQ 105 in the thread context where the I/O submission event occurs and then the task of processing the response to the non-processed interrupt, which is stored in the completion queue CQ 103, in the same thread context. In detail, the I/O submission handler 104 performs an operation of snooping the completion queue CQ in the thread context where the I/O submission event occurs to thereby perform the task of processing the response to the non-processed interrupt, which has not been processed during the interrupt masking enable state and is stored in the completion queue CQ 103.

As another example, the I/O submission handler 104 may perform an operation of snooping the completion queue CQ via the I/O completion handler 102 in the thread context where the I/O submission event occurs. In this case, the I/O completion handler 102 may perform the task of processing the response to the non-processed interrupt, which has not been processed during the interrupt masking enable state and is stored in the completion queue CQ 103.

Accordingly, task of processing the response to the non-processed interrupt, which has not been processed during the interrupt masking enable state and is stored in the completion queue CQ 103, may be performed in the thread context where the I/O submission event occurs.

FIG. 21 illustrates that an internal event, which has not been processed in a high time period of a masking enabled state because an external interrupt signal External Int. is not generated, is processed in the thread context where the I/O submission event occurs. For reference, the internal event that is not processed because the external interrupt signal External Int. is not generated is stored in the completion queue CQ 103.

Figure 20:
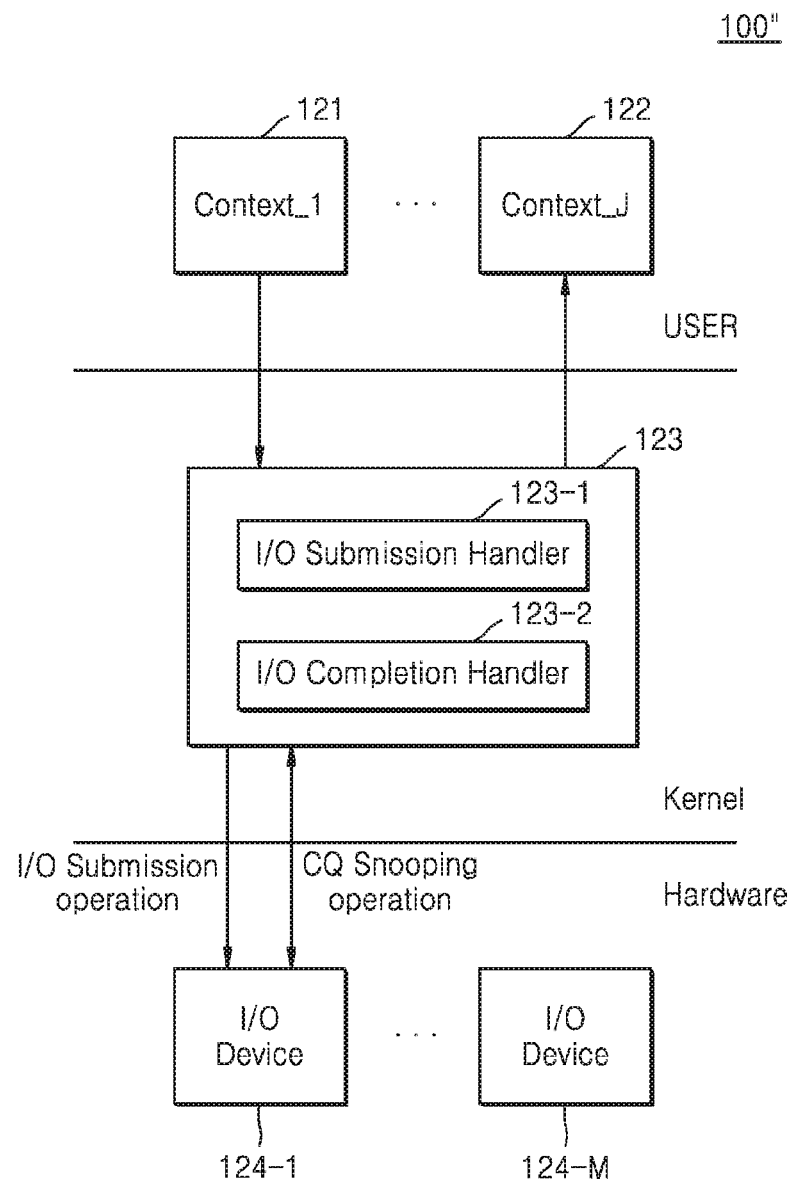
FIG. 20 illustrates a process of processing an interrupt in an interrupt masking enable state in a system, according to some example embodiments.

FIG. 20 illustrates a process of processing an interrupt in an interrupt masking enable state in a system 100", according to some example embodiments.

Referring to FIG. 20, the system 100" may be divided into a user area, a kernel area, and a hardware area.

Contexts Context_1 to Context_J being executed are included in the user area, an I/O submission handler 123-1 and an I/O completion handler 123-2 are included in the kernel area, and I/O devices 124-1 to 124-M are included in the hardware area. The I/O submission handler 123-1 and the I/O completion handler 123-2 may be included in a program installed in a device driver 123.

For example, when an I/O submission thread is generated in the I/O device that is set to the interrupt masking enable state in the context Context_1 included in the user area, the I/O submission handler 123-1 in the kernel area performs I/O submission operation on the I/O device 124-1 included in the hardware area. The I/O submission handler 123-1 performs an operation of snooping the completion queue in the I/O device 124-1 through the I/O completion handler 123-2 without switching contexts. If there is a non-processed event in the completion queue in the I/O device 124-1, a response to the non-processed event is processed by the I/O completion handler 123-2.

FIG. 21 illustrates a timing chart regarding main signals for explaining an operation of processing an adaptive interrupt, according to some example embodiments.

Referring to FIG. 21, four internal events are processed in an I/O submission context after an I/O device is set to the adaptive masking mode. Eventually, the internal events are not generated as external interrupts. With regard to a fifth internal event generated after the I/O device is set to the adaptive masking mode, a next I/O submission is not processed within a threshold time interval T0, and thus, the fifth internal event is not processed in the I/O submission context. Accordingly, a timeout occurs at the threshold time interval T0, and an external interrupt is generated to thus process the external interrupt in an interrupt context of the host.

In FIG. 21, a time delay between an internal event and a next I/O submission is indicated by a brace ( ⌒ ). It is found that a time delay with regard to all internal events does not exceed T0.

Figure 22:
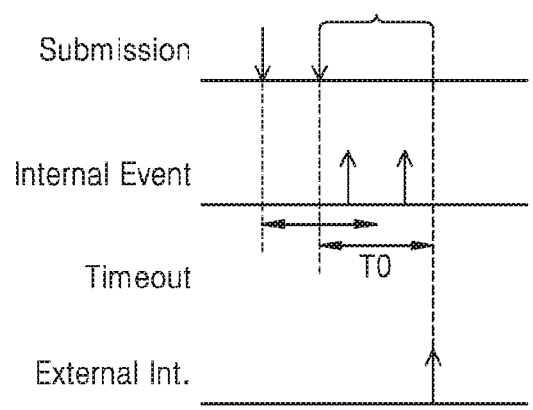
FIG. 22 illustrates an interrupt latency when a method of processing an adaptive interrupt is used, according to some example embodiments.

FIG. 22 illustrates an interrupt latency in a case where a method of processing an adaptive interrupt is used, according to some example embodiments. FIG. 22 illustrates a bad case with regard to a time delay in a masked internal event in which an internal event indicating completion of a first submission occurs immediately after a second I/O submission occurs. However, even in this case, a time delay greater than the timeout duration T0 is generated.

Then, a method of processing an adaptive interrupt, which is performed by various types of computing systems and includes exemplary embodiments of FIGS. 5 to 9, will be described below with reference to flowcharts of FIGS. 23, 24, 25, and 26. It will be understood that the system described as implementing one or more of the methods described below with reference to flowcharts of FIGS. 23, 24, 25, and 26 may include adaptive interrupt processing module, a system implementing one or more portions of the adaptive interrupt processing module via execution of program code, some combination thereof, or the like, without explicitly stating such.

Figure 23:
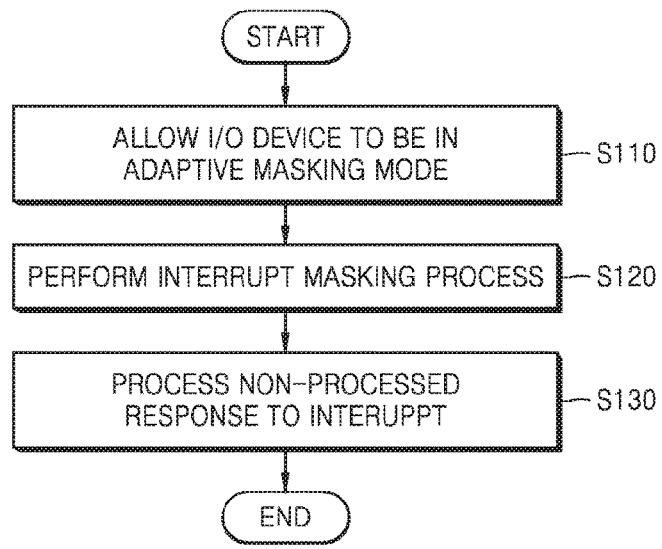
FIG. 23 illustrates a flowchart of a method of processing an adaptive interrupt according to some example embodiments.

FIG. 23 illustrates a flowchart of a method of processing an adaptive interrupt according to some example embodiments.

In operation S110, a system allows an I/O device to be in an adaptive masking mode when at least one factor value regarding the workload of the system exceeds a first threshold condition that is initially set. The system may set the I/O device to the adaptive masking mode when the number of interrupts generated per unit of elapsed time exceeds a second threshold value.

In operation S120, the system performs an interrupt masking process when a time interval between the I/O submission events of the I/O device that is set to the adaptive masking mode is less than a first threshold value. The system performs an operation of setting the I/O device, which is in the adaptive masking mode, to an interrupt masking disable state when an $(N+1)^{th}$ I/O submission event does not occur in a time period from a point of time when an $N^{th}$ I/O submission event occurs (where, N is an integer equal to or greater than 1) to a threshold time point. In the interrupt masking disable state, the interrupt masking process is skipped. Then, the system performs an operation of setting the I/O device to the interrupt masking enable state again when the I/O submission event occurs in the I/O device after a state of the I/O device is set to the interrupt masking disable state.

In a thread context where an I/O submission event occurs, the system performs an operation of processing a response to a non-processed interrupt according to the interrupt masking process in operation S130. The system may perform a task of inserting a command regarding the I/O submission event into the submission queue in the thread context where the I/O submission event occurs and a task of processing the response to the non-processed interrupt according to the interrupt masking process.

Figure 24:
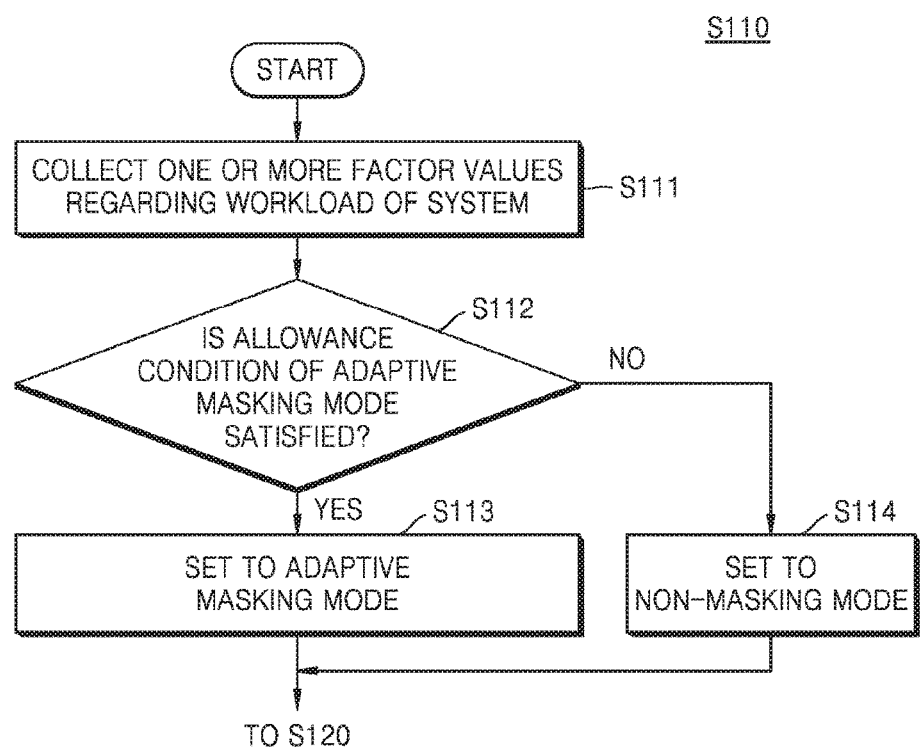
FIG. 24 illustrates a detailed flowchart of an operation of setting an I/O device to an adaptive masking mode, wherein the operation is included in the method of FIG. 23.

FIG. 24 illustrates a detailed flowchart of operation S110 of setting the I/O device to the adaptive masking mode which is illustrated in FIG. 23.

In operation S111, the system collects one or more factor values regarding a workload. For example, one or more factor values regarding at least one of a workload, consumed power, and a detected temperature of each I/O device included in the system may be collected. As another example, the number of interrupts generated per unit of elapsed time in each I/O device included in the system may be collected because the workload of the I/O device may be evaluated based on the number of interrupts generated per unit of elapsed time.

In operation S112, the system determines whether a condition for setting each I/O device to the adaptive masking mode is satisfied based on the collected factor values. The system may determine whether there is an I/O device, of which at least one of the workload, consumed power, and detected temperature exceeds a threshold condition, from among the I/O devices included in the system. As another example, the system may determine whether there is an I/O device, of which the number of interrupts generated per unit of elapsed time exceeds a second threshold value, from among the I/O devices included in the system.

In operation S113, the system sets an I/O device, which satisfies the condition for setting each I/O device to the adaptive masking mode, to the adaptive masking mode. An I/O device, of which at least one of the workload, consumed power, and detected temperature exceeds the threshold condition, from among the I/O devices included in the system may be set to the adaptive masking mode. As another example, an I/O device, of which the number of interrupts generated per unit of elapsed time exceeds the second threshold value, from among the I/O devices included in the system may be set to the adaptive masking mode.

In operation S114, the system allows an I/O device that does not satisfy the above condition to be set to a non-masking mode.

Figure 25:
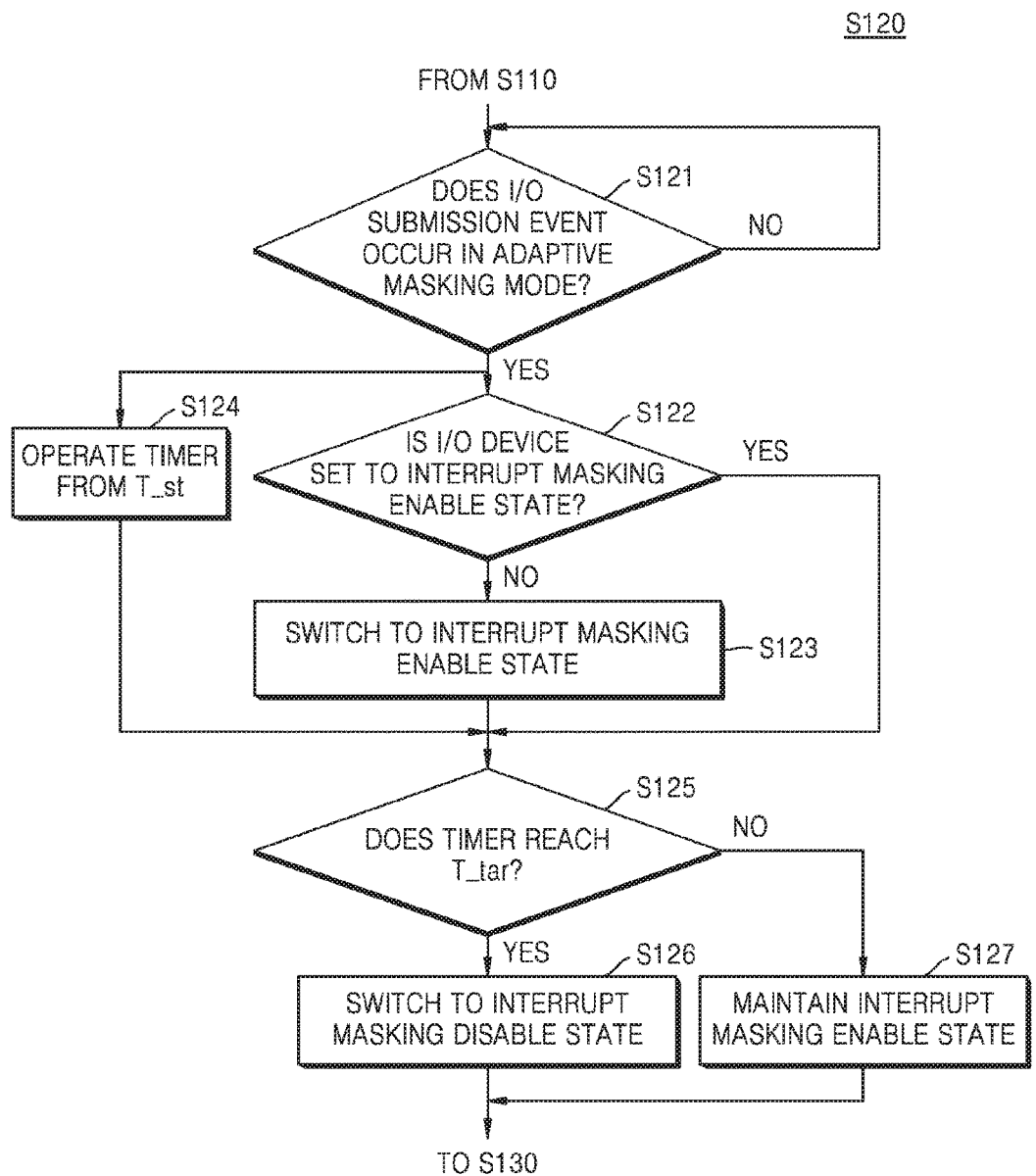
FIG. 25 illustrates a detailed flowchart of an operation of performing an interrupt masking process, wherein the operation is included in the method of FIG. 23.

FIG. 25 illustrates a detailed flowchart of operation S120 of processing interrupt masking of FIG. 23.

The system determines whether an I/O submission event occurs while the I/O device is in an adaptive masking mode in operation S121. In detail, a determination as to whether an I/O submission event regarding the I/O device that is set to the adaptive masking mode occurs is made.

After the determination is made in operation S121, the system determines whether the I/O device is set to an interrupt masking enable state when the I/O submission event regarding the I/O device occurs, in operation S122.

After the determination is made in operation S122, the system switches a state of the I/O device to the interrupt masking enable state when the I/O device that is set to the adaptive masking mode is not in the interrupt masking enable state, in operation S123. Accordingly, the state of the I/O device that is set to the adaptive masking mode is switched to the interrupt masking enable state due to the occurrence of the I/O submission event.

After the determination is made in operation S122, operation S125 is performed when the I/O device that is set to the adaptive masking mode is set to the interrupt masking enable state.

Also, after the determination is made in operation S121, when the I/O submission event regarding the I/O device that is set to the adaptive masking mode occurs, a timer corresponding to the I/O device operates from an initial setting value T_st, in operation S124.

After the system sets the I/O device, which has been in the adaptive masking mode, to the interrupt masking enable state and sets the timer to start operating based on the I/O submission event, the system determines whether the timer has reached a target value T_tar in operation S125.

After the determination is made in operation in operation S125, the system sets an I/O device, of which a timer has reached the target value T_tar, to the interrupt masking disable state in operation S126, which means that a state of the I/O device is switched to the interrupt masking disable state from the interrupt masking enable state because an $(N+1)^{th}$ I/O submission event does not occur in a time period from a point of time when an $N^{th}$ I/O submission event occurs (where, N is an integer equal to or greater than 1) to a threshold time point T0. The threshold time point T0 corresponds to T_tar to T_st.

After the determination is made in operation in operation S125, the system allows an I/O device, which is set to the interrupt masking enable state and includes a timer having reached the target value T_tar, to remain in the interrupt masking enable state in operation S127. When the time interval between the I/O submission events is less than the threshold time point T0 in a time period where the I/O device is set to the adaptive masking mode, the system allows the I/O device to remain in the interrupt masking enable state.

Figure 26:
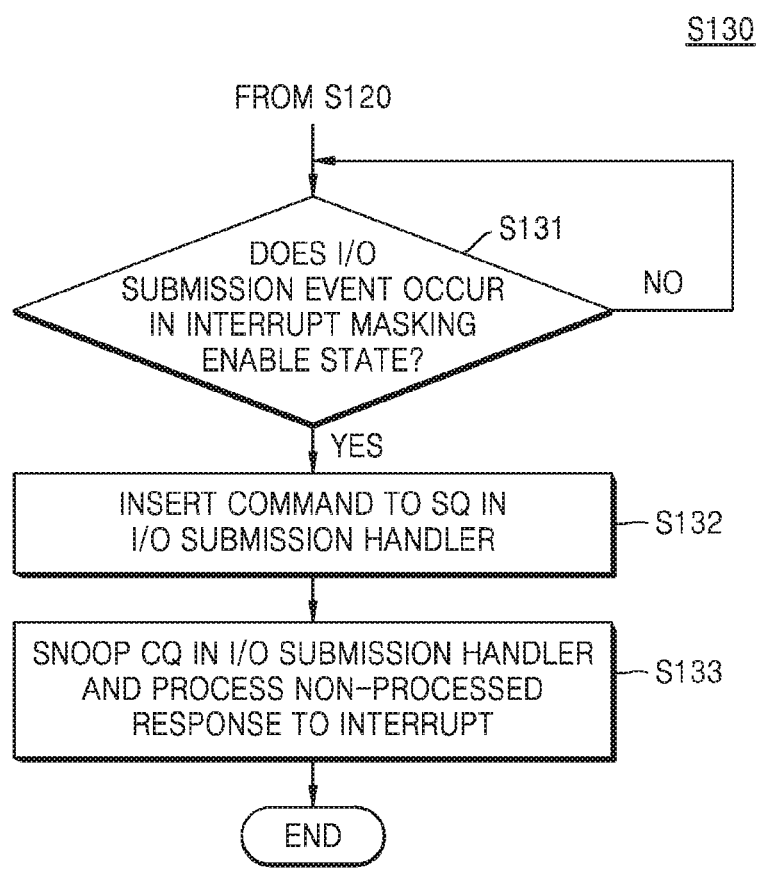
FIG. 26 illustrates a detailed flowchart of an operation of processing a response to a non-processed interrupt, wherein the operation is included in the method of FIG. 23.

FIG. 26 illustrates a detailed flowchart of operation S130 of processing a response to the non-processed interrupt of FIG. 23.

In operation S131, a system determines whether an I/O submission event occurs in an I/O device that is the interrupt masking enable state.

In operation S132, the system performs an operation of inserting a command regarding an I/O submission event into a submission queue in an I/O submission handler when an I/O submission event occurs in the I/O device that is set to the interrupt masking enable state.

In operation S133, the system performs an operation of snooping a completion queue and a response to a non-processed interrupt in the I/O submission handler.

Accordingly, the system may perform a task of inserting a command regarding the I/O submission event into the submission queue in the thread context where the I/O submission event occurs in the I/O device that is set to the interrupt masking enable state and then a task of processing the response stored in the completion queue in the same context.

While the inventive concepts has been particularly shown and described with reference to exemplary embodiments thereof, it will be understood that various changes in form and details may be made therein without departing from the spirit and scope of the following claims.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of processing an adaptive interrupt, the method comprising:
    setting at least one input/output (I/O) device to an adaptive masking mode when at least one factor value of the at least one I/O device exceeds a first threshold condition, the at least one factor value being associated with a workload of a computing system, the computing system including the at least one I/O device;
    selectively performing an interrupt masking process for the at least one I/O device set to the adaptive masking mode in response to a determination that a time interval between I/O submission events is less than a first threshold value; and
    processing a response to a non-processed interrupt according to the interrupt masking process in a thread where at least one I/O submission event occurs,
    wherein
    the performing of the interrupt masking process includes blocking a host from switching to an interrupt context in response to an interrupt signal generated by the at least one I/O device, and
    the interrupt signal is generated in a time period where the at least one I/O device is set to the adaptive masking mode.

2. The method of claim 1, wherein
    the workload of the computing system includes a quantity of interrupts generated in the at least one I/O device per unit of elapsed time; and
    the first threshold condition is a second threshold value of interrupts generated in the at least one I/O device per unit of elapsed time.

3. The method of claim 2, wherein the setting the at least one I/O device to the adaptive masking mode includes,
    calculating the quantity of interrupts generated per unit of elapsed time in the at least one I/O device; and
    setting the at least one I/O device to the adaptive masking mode when the calculated quantity of interrupts generated in the at least one I/O device per unit of elapsed time exceeds the second threshold value.

4. The method of claim 1, wherein the setting the at least one I/O device to the adaptive masking mode is based on at least one of a workload, consumed power, and detected temperature of the at least one I/O device exceeding the first threshold condition.

5. The method of claim 1, wherein
the performing of the interrupt masking process includes preventing an interrupt signal generated by the at least one I/O device from being output to a central processing unit (CPU) of a host, and
the interrupt signal is generated in a time period where the at least one I/O device is set to the adaptive masking mode.

6. The method of claim 1, wherein the performing of the interrupt masking process includes,
setting the at least one I/O device to an interrupt masking enable state or maintaining the at least one I/O device in the interrupt masking enable state when the at least one I/O submission event occurs, the at least one I/O device being set to the adaptive masking mode;
operating an interrupt timer of the at least one I/O device set to the adaptive masking mode to start at an initial setting value when the at least one I/O submission event occurs; and
switching the at least one I/O device to an interrupt masking disable state from the interrupt masking enable state when the interrupt timer has reached a target value.

7. The method of claim 6, wherein the performing of the interrupt masking process further includes switching the at least one I/O device from the interrupt masking disable state to the interrupt masking enable state when the at least one I/O submission event occurs in the at least one I/O device set to the adaptive masking mode.

8. The method of claim 6, wherein the performing of the interrupt masking process further includes blocking transmission of an interrupt signal generated by the at least one I/O device to a central processing unit (CPU) of a host or processing of the interrupt signal at the CPU of the host when the at least one I/O device is switched to the interrupt masking enable state.

9. The method of claim 6, wherein the performing of the interrupt masking process further includes transmitting an interrupt signal generated by the at least one I/O device to a central processing unit (CPU) of a host when the at least one I/O device is switched to the interrupt masking disable state, such that an interrupt process is performed by the CPU of the host based on the interrupt signal.

10. The method of claim 1, wherein the processing of the response to the non-processed interrupt includes,
inserting a command into a submission queue, the command being associated with the at least one I/O submission event, and
processing the response to the non-processed interrupt according to the interrupt masking process in a thread context where the at least one I/O submission event occurs.

11. The method of claim 1, wherein the processing of the response to the non-processed interrupt includes,
inserting a command into a submission queue in a thread context where the at least one I/O submission event occurs, the command being associated with the at least one I/O submission event, and
subsequently to inserting the command, processing a response to a non-processed interrupt, the non-processed interrupt being stored in a completion queue in the same thread context.

12. The method of claim 1, further comprising:
switching the at least one I/O device from the adaptive masking mode to a non-masking mode when the at least one factor value of the at least one I/O device is within a range associated with a second threshold condition,
wherein a host performs the interrupt process based on an interrupt signal generated by the at least one I/O device when the at least one I/O device is switched to the non-masking mode.

13. A method of processing an adaptive interrupt, the method comprising:
setting at least one input/output (I/O) device to an adaptive masking mode when at least one factor value of the at least one I/O device exceeds a first threshold condition, the at least one factor value being associated with a workload of a computing system, the computing system including the at least one I/O device;
selectively performing an interrupt masking process for the at least one I/O device set to the adaptive masking mode in response to a determination that a time interval between I/O submission events is less than a first threshold value; and
processing a response to a non-processed interrupt according to the interrupt masking process in a thread where at least one I/O submission event occurs,
wherein the performing of the interrupt masking process includes setting the at least one I/O device to an interrupt masking disable state, such that the interrupt masking process is skipped, when an $(N+1)^{th}$ I/O submission event does not occur in a time period from a point in time when an $N^{th}$ I/O submission event occurs to a threshold time point, the at least one I/O device being set to the adaptive masking mode, N being an integer equal to or greater than 1.

14. A method, comprising:
selectively setting an I/O device to an adaptive masking mode when at least one factor value of the I/O device at least meets a first threshold condition, the at least one factor value being associated with a workload of a computing system, the computing system including the I/O device and a host; and
selectively preventing an interrupt signal generated by the I/O device from being output to the host when the I/O device is set to the adaptive masking mode and a determination is made that a time interval between I/O submission events of the I/O device set to the adaptive masking mode is less than a first threshold value,
wherein
the selectively preventing the interrupt signal includes blocking the host from switching to an interrupt context in response to the interrupt signal; and
the interrupt signal is generated in a time period where the I/O device is set to the adaptive masking mode.

15. The method of claim 14, wherein
the workload of the computing system includes a number of interrupts generated in the I/O device per unit of elapsed time; and
the first threshold condition is a second threshold value of interrupts generated in the I/O device per unit of elapsed time.

16. The method of claim 14, further comprising:
setting the I/O device to an interrupt masking enable state or maintaining the I/O device in the interrupt masking enable state when an I/O submission event occurs, the I/O device being set to the adaptive masking mode; and selectively preventing the interrupt signal from being output to the host based on whether the I/O device is set to the interrupt masking enable state.

17. The method of claim 16, further comprising:

operating an interrupt timer of the I/O device set to the adaptive masking mode to start at an initial setting value when the I/O submission event occurs; and switching the I/O device from the interrupt masking enable state to an interrupt masking disable state when the interrupt timer has reached a target value.

18. The method of claim 16, further comprising:

switching the I/O device from the interrupt masking disable state to the interrupt masking enable state when the I/O submission event occurs in the I/O device set to the adaptive masking mode.

19. The method of claim 14, further comprising:

calculating a number of interrupts generated per unit of elapsed time in the I/O device; and setting the I/O device to a non-masking mode when the calculated number of interrupts generated per unit of elapsed time in the I/O device does not exceed the first threshold value.

\* \* \* \* \*